(12) United States Patent
Aoki et al.

(10) Patent No.: US 8,395,803 B2
(45) Date of Patent: Mar. 12, 2013

(54) PRINTING APPARATUS AND INFORMATION RECORDING SYSTEM

(75) Inventors: Kazuma Aoki, Kasugai (JP); Makoto Matsuda, North Brunswick, NJ (US); Kiyotaka Ohara, Nagoya (JP); Satoshi Watanabe, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1490 days.

(21) Appl. No.: 11/513,240

(22) Filed: Aug. 31, 2006

(65) Prior Publication Data

US 2007/0047845 A1 Mar. 1, 2007

(30) Foreign Application Priority Data

Aug. 31, 2005 (JP) ................................. 2005-251785

(51) Int. Cl.
*G06K 9/54* (2006.01)
(52) U.S. Cl. ...................... 358/1.16; 358/1.18; 358/1.15; 382/305
(58) Field of Classification Search .................. 358/1.1, 358/1.15, 1.13, 468, 1.16, 1.14, 1.18; 235/381; 382/305
See application file for complete search history.

(56) References Cited

U.S. PATENT DOCUMENTS

| | | | |
|---|---|---|---|
| 6,882,439 B2 * | 4/2005 | Ishijima ........................ | 358/1.15 |
| 6,891,636 B1 * | 5/2005 | Kawai et al. .................. | 358/1.18 |
| 6,913,195 B2 * | 7/2005 | Shinkai .......................... | 235/381 |
| 6,917,440 B2 * | 7/2005 | Kondo et al. .................. | 358/1.15 |
| 6,999,190 B2 | 2/2006 | Shimbori et al. | |
| 7,170,624 B2 * | 1/2007 | Chalstrom et al. ........... | 358/1.15 |
| 7,184,180 B2 * | 2/2007 | Yasumaru ....................... | 358/468 |
| 7,280,237 B2 * | 10/2007 | Komiya ......................... | 358/1.13 |
| 7,386,603 B2 | 6/2008 | Shiba et al. | |
| 2002/0054324 A1 * | 5/2002 | Okada et al. .................. | 358/1.15 |
| 2006/0069615 A1 * | 3/2006 | Gupta ............................ | 705/14 |
| 2007/0046978 A1 * | 3/2007 | Aoki et al. .................... | 358/1.14 |

FOREIGN PATENT DOCUMENTS

| | | |
|---|---|---|
| JP | 2001-229246 | 8/2001 |
| JP | 2001-296983 | 10/2001 |
| JP | 2002-92486 | 3/2002 |

(Continued)

OTHER PUBLICATIONS

Japanese Office Action, with English translation, issued in Japanese Patent Application No. JP 2005-251785, mailed May 27, 2008.

(Continued)

*Primary Examiner* — David K Moore
*Assistant Examiner* — Ashish K Thomas
(74) *Attorney, Agent, or Firm* — Baker Botts L.L.P.

(57) ABSTRACT

A contents providing system includes a communication unit, a print control unit, an expendable amount deriving unit and an expendable amount storing control unit. The communication unit communicates with a contents server having contents data. The print control unit controls a printer to print the contents data and output a printed material imaging the contents data if the communication unit receives the contents data from the contents server. The expendable amount deriving unit derives an amount of an expendable item required for imaging the contents data in the printer. The expendable amount deriving unit derives the amount of the expendable item in accordance with a size of an image printed by the printer. The expendable amount storing control unit stores information representing the amount of the expendable item derived by the expendable amount deriving unit in a memory unit.

6 Claims, 22 Drawing Sheets

FOREIGN PATENT DOCUMENTS

| | | |
|---|---|---|
| JP | 2002-132917 | 5/2002 |
| JP | 2002-297619 | 10/2002 |
| JP | 2002-312672 | 10/2002 |
| JP | 2002-366830 | 12/2002 |
| JP | 2003-016356 | 1/2003 |
| JP | 2004-240625 | 8/2004 |

OTHER PUBLICATIONS

Japanese Office Action, with English translation, issued in Japanese Patent Application No. JP 2005-251785 dated on Dec. 16, 2008.

* cited by examiner

FIG. 3A

```
<OUTPUT DATA TITLE = "TRIP INFORMATION">

<KIND OF PARTIAL DATA = "ADVERTISEMENT" COORDINATE x = "0cm" COORDINATE y
  = "0cm" HORIZONTAL WIDTH = "10cm" VERTICAL LENGTH = "3cm">
    <ADVERTISING PROVIDER ID> KID1 </ADVERTISING PROVIDER ID>
    <ADVERTISING PROVIDER URL> http://*/*/*** </ADVERTISING PROVIDER URL>
    <CONDITION ID> JID1 </CONDITION ID>
    <PRINT DATA TYPE= "DATA">
      (ADVERTISING PRINT DATA (BODY))
    </PRINT DATA>
  </PARTIAL DATA>                                                          } D1

<KIND OF PARTIAL DATA = "GENERAL" COORDINATE x = "0cm" COORDINATE y = "0cm"
  HORIZONTAL WIDTH = "18cm" VERTICAL LENGTH = "20cm">
    <PRINT DATA TYPE= "DATA">
      (GENERAL PRINT DATA (BODY))
    </PRINT DATA>
  </PARTIAL DATA>                                                          } D2

<KIND OF PARTIAL DATA = "ADVERTISING" COORDINATE x = "8cm" COORDINATE y
  = "23cm" HORIZONTAL WIDTH = "10cm" VERTICAL LENGTH = "2cm">
    <ADVERTISING PROVIDER ID> KID2 </ADVERTISING PROVIDER ID>
    <PRINT DATA TYPE= "URL">
      (ADVERTISING PRINT DATA (ACQUISITION SOURCE URL))
    </PRINT DATA>
  </PARTIAL DATA>                                                          } D3

</OUTPUT DATA>
```

FIG. 3B

INFORMATION OF TRIP TO HAWAII
INFORMATION URL: •1.••/•••

WRITE THIS URL TO ACQUIRE THIS FORM

○○ ESTATE AGENT
Tel.xxx-xxx-xxxx

FIG. 3C

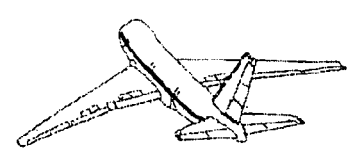

CONDITION ID: JID1

○○ COMPANY
REQUEST FORM FOR TRIP TO HAWAII

| DESIGNATION OF PLAN | |
| ADDRESS | |
| NAME | |
| NUMBER OF PERSONS | |
| DEPARTURE TIME | |

DESIGNATION URL: •1.••/•••/chumon
ADVERTISING PROVIDER ID: KID1

- TRIP INFORMATION
- GOURMET INFORMATION
- 2005/08/01 NEWS

FIG. 11

```
<AGGREGATION DATA TYPE = "DUMMY">
    <PAGE NUMBER> 1 </PAGE NUMBER>
</AGGREGATION DATA>
```

FIG. 13A

```
<AGGREGATION DATA>
   <PAGE NUMBER> 1 </PAGE NUMBER>
   <CONSUMER ID> CID1 </CONSUMER ID>
   <ADVERTISING PROVIDER ID> KID1 </ADVERTISING PROVIDER ID>
   <ADVERTISING PROVIDER URL> http://*/*/*** </ADVERTISING PROVIDER URL>
   <CONDITION ID> JID1 </CONDITION ID>
   <SHEET TYPE> A4 GENERAL SHEET </SHEET TYPE>
   <NUMBER OF SHEET> 0.1 </NUMBER OF SHEET>
   <PRINT TYPE> INK A </PRINT TYPE>
   <C> *** pixel </C>
   <M> *** pixel </M>
   <Y> *** pixel </Y>
   <K> *** pixel </K>
</AGGREGATION DATA>
```

FIG. 13B

```
<AGGREGATION DATA>
   <PAGE NUMBER> 2 </PAGE NUMBER>
   <CONSUMER ID> CID1 </CONSUMER ID>
   <ADVERTISING PROVIDER ID> KID1 </ADVERTISING PROVIDER ID>
   <SHEET TYPE> B5 GLOSSY SHEET </SHEET TYPE>
   <NUMBER OF SHEET> 0.2 </NUMBER OF SHEET>
   <PRINT TYPE> INK A </PRINT TYPE>
   <C> *** pixel </C>
   <M> *** pixel </M>
   <Y> *** pixel </Y>
   <K> *** pixel </K>
</AGGREGATION DATA>
```

(ADVERTISING PROVIDER TABLE)

| ADVERTISING PROVIDER ID | URL |
|---|---|
| KID1 | http://*.*/*** |
| KID2 | |
| KID3 | http://*.*/*** |
| KID4 | http://*.*/*** |
| ⋮ | ⋮ |

FIG. 22

(AGGREGATION TABLE) 45

| ADVERTISING PROVIDER ID | CONSUMER ID | POINT OF EXPENDABLE ITEM | CONDITION ID | CONDITION FLAG |
|---|---|---|---|---|
| KID1 | CID2 | 34 | JID1 | 1 |
| KID2 | CID5 | 25 | JID3 | 0 |
| KID3 | CID1 | 11 | | 1 |
| ⋮ | ⋮ | ⋮ | ⋮ | ⋮ |

FIG. 23

(FIRST COUNT TABLE) 46

| PRINT TYPE | CYAN (Pc) | MAGENTA (Pm) | YELLOW (Py) | BLACK (Pk) |
|---|---|---|---|---|
| INK A | *** | *** | *** | *** |
| INK B | *** | *** | *** | *** |
| ⋮ | ⋮ | ⋮ | ⋮ | ⋮ |

FIG. 24

(SECOND COUNT TABLE) 47

| SHEET TYPE | POINT (Ps) |
|---|---|
| A4 GENERAL SHEET | *** |
| A4 GLOSSY SHEET | *** |
| B5 GENERAL SHEET | *** |
| B5 GLOSSY SHEET | *** |
| ⋮ | ⋮ |

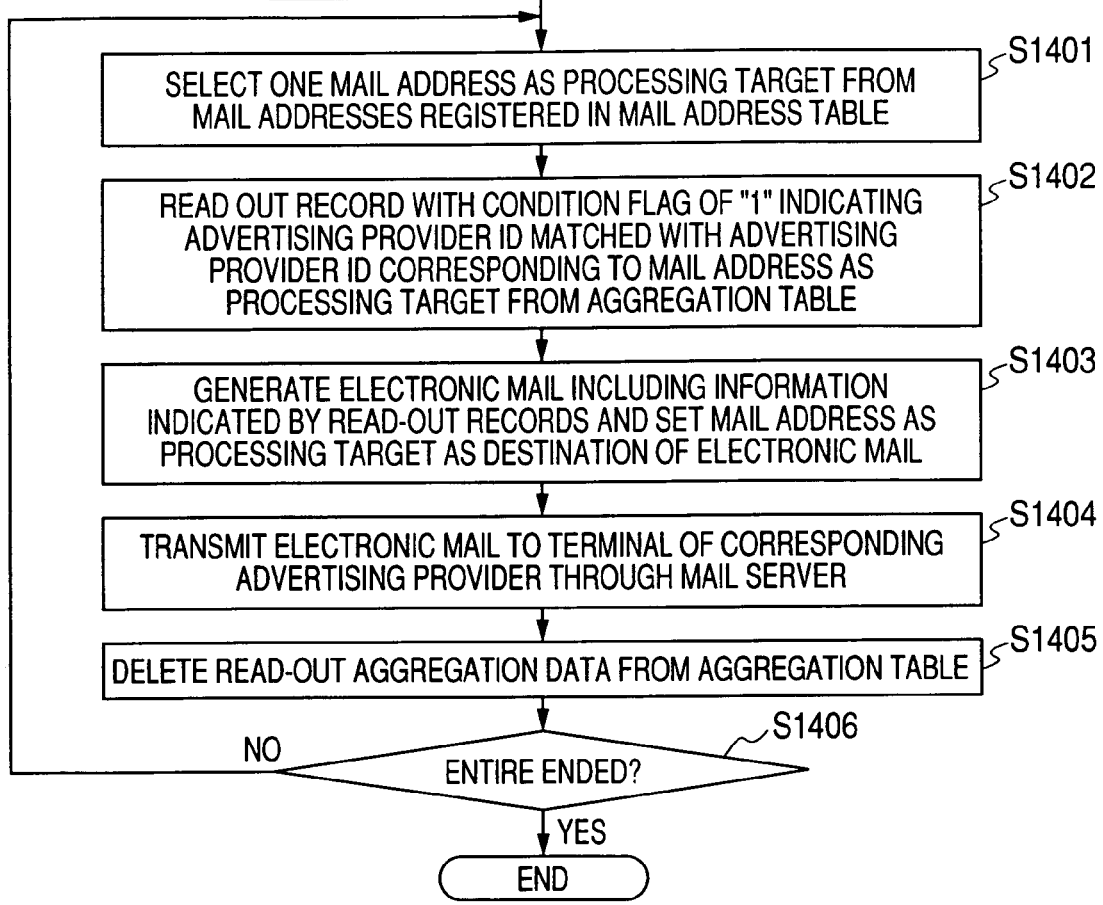

PRINTING APPARATUS AND INFORMATION RECORDING SYSTEM

CROSS REFERENCE TO RELATED APPLICATION

This application claims priority from Japanese Patent Application No. 2005-251785, filed on Aug. 31, 2005, the entire subject matter of which is incorporated herein by reference.

TECHNICAL FIELD

Aspects of the present invention relate to a contents providing system that print-processes contents data transferred through a network and provides a variety of information (contents) to a user.

BACKGROUND

Conventionally, various sites providing contents data are provided on the Internet. These sites are accessed through a personal computer, various contents data provided by the sites are acquired in the personal computer and the acquired data are displayed, so that a user can obtain weather information, news and information on various hobbies on a monitor of the personal computer. In addition, the user can input the contents data that the personal computer acquires in a printer and print these contents data by the printer to obtain a variety of information in a form of a printed material.

Besides, there is known a printer that is accessible to an Internet site, acquires the contents data from the site in accordance with the user's request and prints these contents data. The user can obtain the variety of information, without using a personal computer, in a form of a printed material by this printer.

In recent years, as general persons come to use the Internet widely, the contents data tend to be used as advertising media. For example, contents data for advertising some product corresponding to a hobby with contents data presenting information on the hobby are transmitted to the user and the product corresponding to the hobby is advertised for the user.

In such a case, a cost required for the advertisement printing, which an advertising provider used to bear conventionally, is burdened to the user in accordance with a printing processing of the contents data. In particular, in the printer accessible to sites, since the variety of information included in the contents data are provided to the user in the printed material form, the cost required for the advertisement printing is excessively burdened to the user.

There is proposed that expendable items such as ink or a paper are provided to the user in correspondence with the number of papers required for the advertisement printing so that the cost required for the advertisement printing is not burdened to the user (for example, refer to JP-A-2002-92486).

SUMMARY

Aspects of the present invention provide a system that enables a printer to print-process contents data for advertisement having various image sizes and adequately derive amounts of expendable items consumed for the advertisement printing.

BRIEF DESCRIPTION OF THE DRAWINGS

FIGS. 3A to 3C are explanatory diagrams illustrating output data provided from an application server;

FIG. 11 is an explanatory diagram illustrating a configuration of dummy aggregation data;

FIGS. 13A and 13B are explanatory diagrams illustrating a configuration of aggregation data stored in an aggregation data buffer;

FIG. 18 is an explanatory diagram illustrating a configuration of an advertising provider table;

FIG. 22 is an explanatory diagram illustrating a configuration of an aggregation table;

FIG. 23 is an explanatory diagram illustrating a configuration of a first count table;

FIG. 24 is an explanatory diagram illustrating a configuration of a second count table;

FIG. 25 is a flowchart illustrating an aggregation data delivering process; and

FIG. 26 is an explanatory diagram illustrating a configuration of a mail address table.

DETAILED DESCRIPTION

General Overview

According to an aspect of the invention there is provided, a contents providing system including a communication unit, a print control unit, an expendable amount deriving unit and an expendable amount storing control unit. The communication unit in the contents providing system communicates with a contents server having advertisement contents data. The print control unit controls a printer to print the contents data and output a printed material imaging the contents data when the communication unit receives the contents data from the contents server.

In addition, the expendable amount deriving unit derives an amount of expendable item required for imaging the contents data in the printing processing executed by the printer which receives an operation of the print control unit. The expendable amount deriving unit derives the amount of the expendable item in accordance with a size of an image printed by the printer. The expendable amount storing control unit stores information representing the amount of the expendable item derived by the expendable amount deriving unit in a memory unit.

The memory unit may be a removal one. Also, the memory unit may be shared by plural printers.

As described above, in the contents providing system, the amount of the expendable item used in printing the advertisement image based on the advertising contents data is derived in accordance with the size of the printing image. Accordingly, in the contents providing system, the amount of the expendable item used in printing the advertisement image can be found more precisely than in deriving the amount of the expendable item in response to the number of sheets of a paper. In other words, even when the communication unit receives the contents data having various image sizes, the amount of the expendable item required for the advertisement printing is adequately derived to be stored in the memory unit. Therefore, the cost required for the advertisement printing can be returned to the user more adequately.

Incidentally, image-forming materials (coloring materials) such as toners, inks, ink ribbons, etc., and paper are exemplified as the expendable items. In the contents providing system, one expendable item or plural expendable items can be derived as the amount of the expendable item.

Hereinafter, exemplary aspects of the invention will be described with reference to the drawings.

[1. Overall Configuration]

Figure 1:
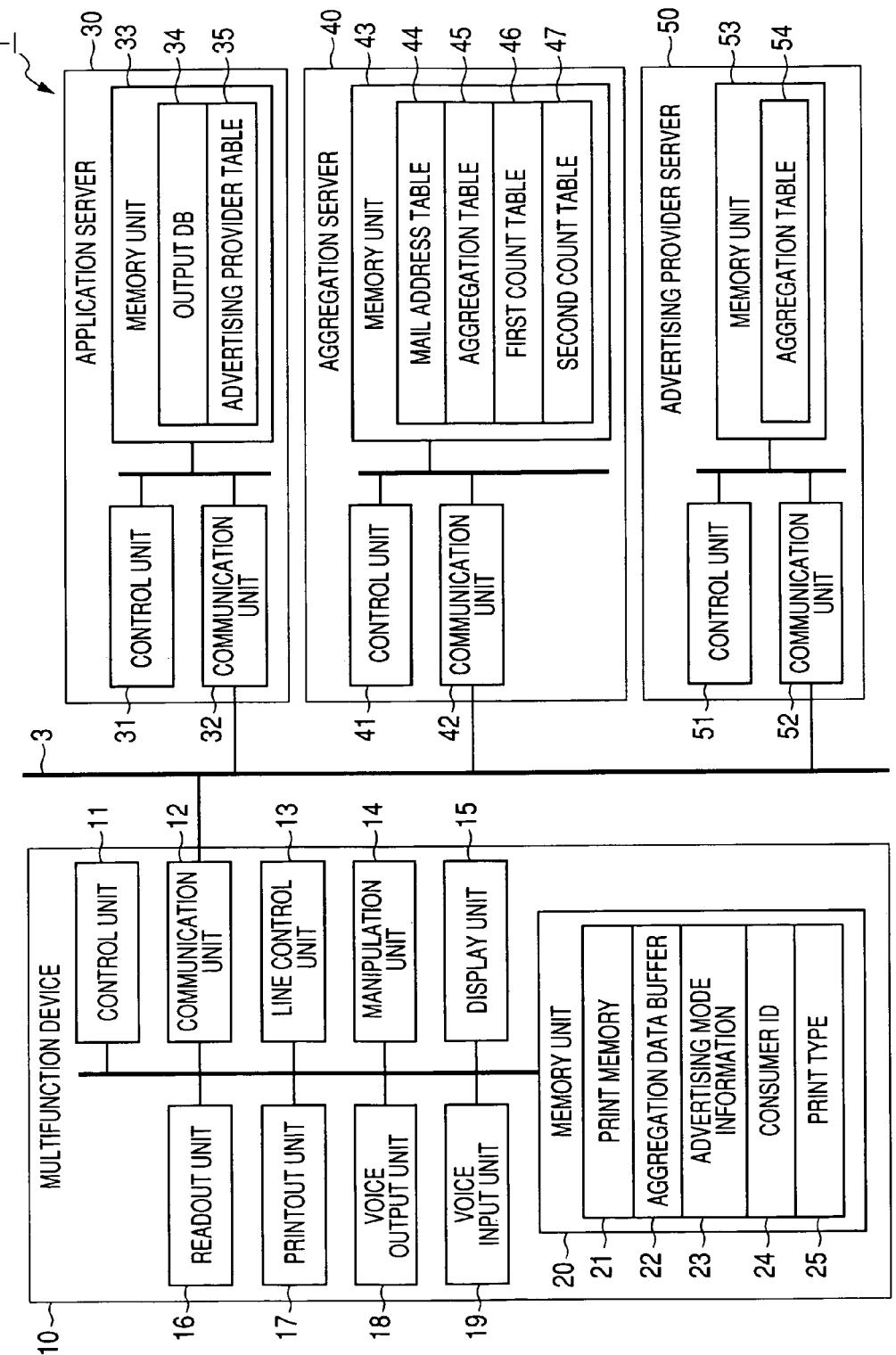
FIG. 1 is a block diagram schematically illustrating a configuration of a contents providing system according to an aspect of the present invention.

FIG. 1 is a block diagram schematically illustrating a contents providing system 1 according to an exemplary aspect of the invention. The contents providing system 1 according to the exemplary aspect comprises a multifunction device 10, an application server 30, an aggregation server 40, and an advertising provider server 50. In the contents providing system 1, the multifunction device 10 and the servers 30, 40, and 50 are connected to the Internet 3 as a wide area network and can perform a data communication with each other. Although only one multifunction device 10 and only one advertising provider server 50 are shown in FIG. 1, the multifunction device 10 is disposed for each consumer (user) and the advertising provider server 50 is disposed for each advertising provider in the contents providing system 1.

The contents providing system 1 according to the exemplary aspect has a configuration suitable for constructing a business model for providing an advertisement to a user by allowing the user's multifunction device 10 to print an advertising image, and aggregating the amounts of expendable items consumed when the multifunction device 10 prints the advertising image to return money corresponding to the amounts to the consumer from the advertising provider.

That is, the application server 30 has output data in which print data (hereinafter, referred to as "advertising print data") for instructing the multifunction device 10 to print the advertising image and non-advertising print data (hereinafter, referred to as "general print data") other than the advertising print data are included as content data.

Figure 2:
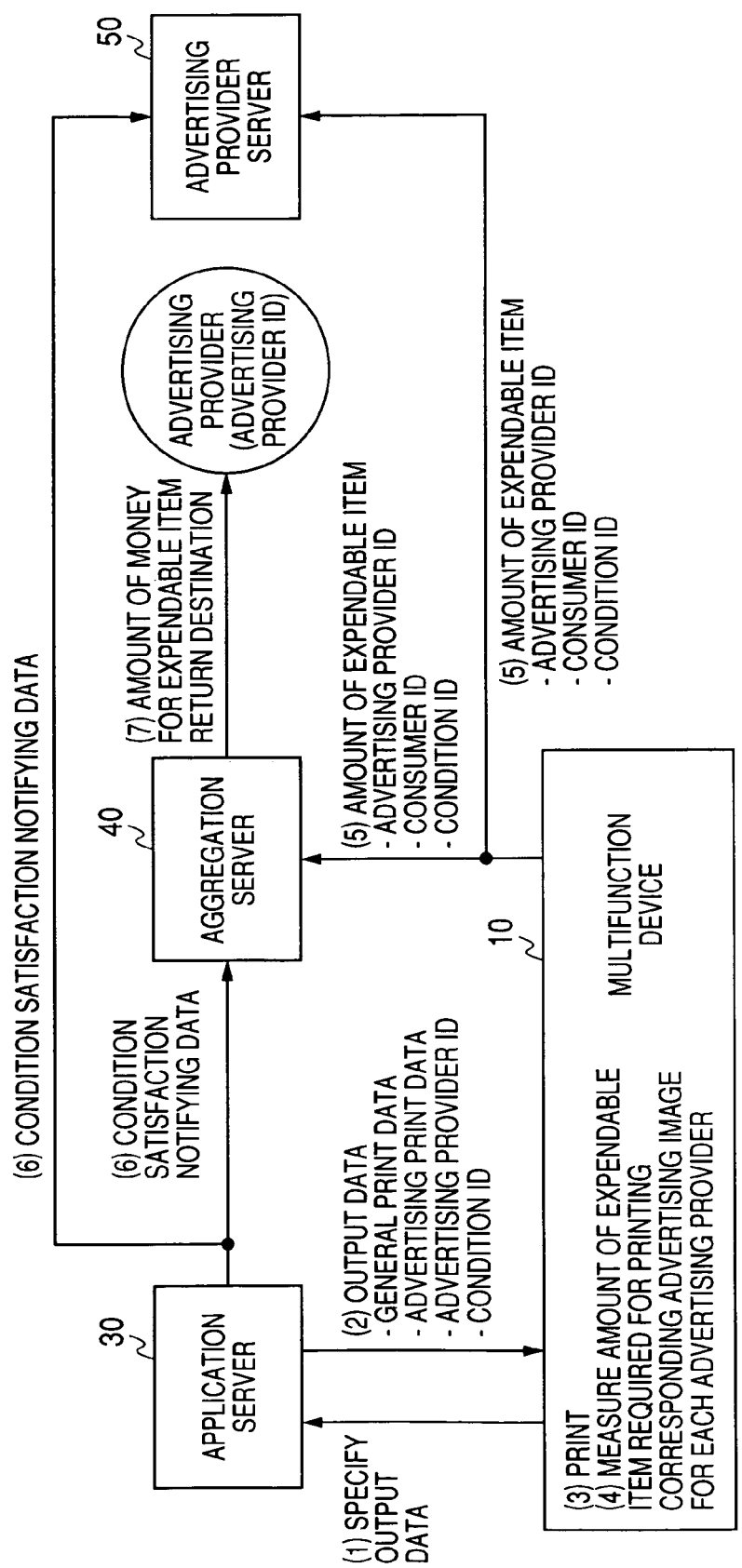
FIG. 2 is a block diagram illustrating a business model using the contents providing system.

As shown in FIG. 2, the multifunction device 10 specifies and acquires output data required by the consumer among the output data of the application server 30 in accordance with the instruction from the consumer, and forms (prints) an image based on the output data on a sheet of paper. Through the printing, the advertising image is formed on the sheet of paper along with the non-advertising image (an image indicating weather information, news, hobby information, and the like) based on the general print data.

The multifunction device 10 measures the amount (amount of consumption) of expendable item required for printing the advertising image for each expendable item (each of coloring materials and sheets) and transmits information indicating the measurement result (aggregation data to be described later) to the aggregation server 40. The aggregation server 40 aggregates the amount of consumption of each expendable item on the basis of the information indicating the measurement result transmitted from the multifunction device 10, calculating the amount of money (expendable item point) corresponding to the amount of consumption, and stores information indicating the calculation result in the memory unit 43. When a predetermined condition is satisfied, the aggregation server 40 sends the information indicating the calculation result to a terminal device of the advertising provider in the form of an electronic mail.

An advertising provider ID as information for identifying the advertising provider and a condition ID as information for identifying the advertising image are given (attached) to the advertising print data constituting the output data. The multifunction device 10 measures the amount of expendable items required for printing the advertising image every advertising print data to which different advertising provider IDs and condition IDs are given, and sends the information indicating the measurement result to the aggregation server 40 along with the information of the advertising provider ID and the condition ID and a consumer ID as information for identifying a consumer (multifunction device 10). The multifunction device also sends the same information to the advertising provider server 50.

The application server 30 has a program for receiving an order of a product advertised by the advertising print data. When receiving the order of a product from a consumer through the program, the application server sends condition-satisfaction notifying data, which includes the condition ID of the advertising image that has motivated the order of the consumer and the consumer ID corresponding to the consumer, to the aggregation server 40 and the advertising provider server 50.

When receiving the condition-satisfaction notifying data from the application server 30, the aggregation server 40 considers the predetermined condition as being satisfied and sends information indicating the calculation result corresponding to the condition ID indicated by the received condition-satisfaction notifying data to the terminal device of the advertising provider in the form of an electronic mail.

Through the above-mentioned operation of the contents providing system 1, the advertising provider can grasp the amount of consumption of expendable items consumed when the multifunction device 10 prints the advertising image, and can return the money corresponding to the amount of consumption or the expendable items to the consumer.

In the contents providing system 1 according to the exemplary aspect, as long as the consumer does not order a product based on the advertising image associated with the advertising print data with the condition ID, the aggregation server 40 does not notify the advertising provider of the amount of money (the calculation result) corresponding to the amount of expendable items required for printing the advertising image. This is designed to satisfy the needs of the advertising provider that the advertising provider wants to perform the return to a consumer, not on the basis of the fact that the advertising image is printed, but on the basis of the fact that the order based on the advertising image is made by the consumer.

In the contents providing system 1 according to the exemplary aspect, the same information as being input to the aggregation server 40 is input to the advertising provider server 50 managed by the advertising provider. This is designed to satisfy the needs of the advertising provider that the advertising provider wants to confirm whether the aggregation data sent from the aggregation server 40 is correct.

[2. Configurations of Multifunction Device and Servers]

Configurations of the constituent elements 10, 30, 40, and 50 of the contents providing system 1 will be described.

[2.1. Configuration of Multifunction Device]

The multifunction device 10 is a multifunction device having a telephone (voice communication) function, a scanner function, a copier function, a facsimile function, and the like, in addition to a printer function as a function of printing an image. As shown in FIG. 1, the multifunction device 10 comprises a control unit 11, a communication unit 12, a line control unit 13, a manipulation unit 14, a display unit 15, a readout unit 16, a printout unit 17, a voice output unit 18, a voice input unit 19, and a memory unit 20.

The control unit 11 is mainly composed of a micro computer including a CPU, a ROM, and a RAM and serves to comprehensively control the constituent elements of the multifunction device 10. The communication unit 12 performs a communication for transmitting and receiving data through the Internet 3. The line control unit 13 performs a communication through a public switched telephone network (PSTN).

The manipulation unit 14 comprises a plurality of keys which can be manipulated by a user and inputs an instruction resulting from the manipulation of the keys by the user to the control unit 11. In addition, the display unit 15 comprises a display panel (see FIG. 5) for displaying a variety of information for the user in accordance with a command from the control unit 11.

The readout unit (scanner) 16 reads out an image from an original sheet by the use of an image sensor such as a charge coupled device (CCD) or a contact image sensor (CIS) in accordance with a command from the control unit 11 and generates image data indicating the read-out image.

The printout unit (printer) 17 prints an image indicated by pixel data on a sheet of paper as a recording medium on the basis of pixel data (image data of a bitmap type) input from the control unit 11. Specifically, the printout unit 17 prints the image indicated by the pixel data on a sheet fed from a sheet feed unit and discharges the printed sheet to a sheet discharge unit. In addition, the printout unit 17 comprises a sheet sensor for optically detecting a type of the sheet (sheet type) fed from the sheet feed unit. The sheet sensor detects the size (A4, B5, or the like) and quality (two kinds of glossy paper and general paper in the exemplary aspect) of a sheet as the sheet type.

In addition, the voice output unit 18 outputs sound indicated by voice data sent through the line control unit 13 from a speaker built in a handset (earpiece) or a speaker built in a body of the multifunction device 10. The voice input unit 19 generates voice data (PCM data) indicating input voice on the basis of a signal input from a microphone built in the handset and supplies the generated voice data to a task for performing the telephone function in the control unit 11.

The memory unit 20 comprises a non-volatile RAM and stores a variety of data in the non-volatile RAM. Specifically, a print memory 21 (see FIG. 9) used as a work area for processing an image at the time of printing and an aggregation data buffer 22 used as a work area for aggregating the amount of expendable items consumed for printing an advertising image are provided in a memory area of the memory unit 20.

Advertising mode information 23 indicating whether an advertising mode is in an ON state or an OFF state is stored in the memory area of the memory unit 20. Here, the advertising mode means an operation mode for switching a permitted status and an inhibited status for printing the advertising image. When the advertising mode is set to the ON state, the multifunction device 10 permits the printout unit 17 to print the advertising image. When the advertising mode is set to the OFF state, the multifunction device inhibits the printout unit 17 from printing the advertising image.

A consumer ID 24 as information for identifying the multifunction device 10 (in other words, information for identifying the consumer possessing the multifunction device 10) and a print type 25 as information indicating kinds of coloring materials (kinds of ink) used for the multifunction device 10 are stored in advance as fixed values in the memory area of the memory unit 20.

[2.2. Configuration of Application Server]

The application server 30 provides a service for providing the output data including the advertising print data and the general print data, and comprises a control unit 31, a communication unit 32, and a memory unit 33.

The control unit 31 is mainly composed of a micro computer including a CPU, a ROM, and a RAM and serves to comprehensively control the constituent elements of the application server 30. The communication unit 32 performs a communication for transmitting and receiving data through the Internet 3. The memory unit 33 stores a variety of data in a hard disc. In addition, the memory unit 33 comprises an output database (output DB) 34 as a database for managing a plurality of output data to be supplied to the multifunction device 10 and an advertising provider table 35 (see FIG. 18) as a table for managing a uniform resource locator (URL) of the advertising provider server 50.

Next, a specific configuration of the output data supplied to the multifunction device 10 from the application server 30 will be described. In the contents providing system 1 according to the exemplary aspect, the output data supplied from the application server 30 are described in a markup language as shown in FIG. 3A.

Specifically, the output data are data in which one unit is set from an output data start tag (<output data title="****">) to an output data end tag (</output data>). A title of the output data ("trip information" in FIG. 3A) is described in the output data start tag.

The output data has a group of partial data between the output data start tag and the output data end tag. That is, in the exemplary aspect, a print image (print target image) is displayed by the group of partial data and the respective partial data indicate a partial image constituting the print image. Specifically, the output data shown in FIG. 3A indicate the image shown in FIG. 3B, and includes partial data D1 corresponding to an advertising image (trip information for Hawaii) at the upper-left side, partial data D2 corresponding to an image at the center, and partial data D3 corresponding to an advertising image (XX estate agent) at the lower-right side.

The respective partial data D1, D2, and D3 are data in which one unit is set from a partial data start tag (<partial data kind="**" coordinates x= . . . >) to a partial data end tag (/<partial data>), and has a variety of information on the partial data in addition to print data (general print data or advertising print data) indicating the partial image.

Specifically, the partial data has a configuration in which a kind of an image indicated by the print data, the coordinates of upper-left vertex in the image, and the horizontal width and the vertical length (height) of the image are described in the partial data start tag. In the exemplary aspect, the partial data are classified into the advertising data and the general data (non-advertising data). The kind of the image described in the partial data start tag indicates to which one of the general data and the advertising data the partial data belongs.

The partial data in which the kind of the image is described as "general" are general data, and general print data are described in the partial data. The partial data in which the kind of the image is "advertisement" is the advertising data, and advertising print data are described in the partial data. In the example shown in FIG. 3B, the partial data D2 corresponding to the image at the center are the general data, and the partial data D1 and D3 corresponding to the image at the upper-left side and the image at the lower-right side are the advertising data.

An advertising provider ID, an advertising provider URL, and a condition ID are described as information on the print data in the advertising data (partial data in which the kind of the image is "advertisement"). Specifically, the advertising provider ID is information for identifying the advertising provider as a source for providing the advertising image indicated by the print data, the advertising provide ID is described between an advertising provider ID start tag (<advertising provider ID>) and an advertising provider ID end tag (</advertising provider ID>) in the advertising data.

In the example shown in FIGS. 3A and 3B, an image of another (different) advertising provider is included in a print image. A value "KID1" is described as the advertising provider ID corresponding to the partial data D1 and a value "KID2" is described as the advertising provider ID corresponding to the partial data D3.

The advertising provider URL is an URL of the advertising provider server 50 managed by an advertising provider which is a source for providing the advertising image. The advertising provider URL is described between an advertising provider URL start tag (<advertising provider URL>) and an advertising provider URL end tag (</advertising provider URL>) in the advertising data. In addition, the advertising provider URL is described in the corresponding advertising data, only when the advertising provider wants to receive the information indicating the amount (amount of consumption) of expendable items required for printing the advertising image directly from the multifunction device. Specifically, the advertising provider URL is described in the corresponding advertising data, only when the advertising provider registers its URL in the advertising provider table 35 of the application server 30.

In other words, the advertising provider URL is not described in the advertising data, when the advertising provider does not want to receive the amount (amount of consumption) of expendable items required for printing the advertising image directly from the multifunction device 10 (when the advertising provider does not register its URL in the advertising provider table 35 of the application server 30).

The condition ID is information for identifying an advertising image and is described between a condition ID start tag (<condition ID>) and a condition ID end tag (</condition ID>) in the advertising data. The condition ID is used to control a condition for notifying the advertising provider of the calculation result of the amount of consumption of expendable items as described above, and is described only in the advertising data of which the advertising provider wants to control the condition. In other words, when the advertising provider does not want to control the notification condition as shown in the partial data D3, the condition ID is not described in the advertising data. In addition, although not shown in FIG. 3A, the partial data in which the advertising provider URL is described but the condition ID is not described or the partial data in which the advertising provider URL is not described but the condition ID is described may exist.

The print data are described between a print data start tag (<print data type="***">) and a print data end tag (</print data>) in the partial data. Specifically, in the exemplary aspect, the URL indicating a body of the print data or an acquisition source of the print data is described between the print data start tag and the print data end tag.

In addition, when the body of the print data is described between the print data start tag and the print data end tag, a value "data" is described as the type of the print data ("***" in the above-mentioned description) in the print data start tag. When the URL indicating the acquisition source of the print data is described between the print data start tag and the print data end tag, a value "URL" is described as the type of the print data in the print data start tag.

In the exemplary aspect, when image data described in a page description language (PDL), image data described in a markup language such as HTML, and image data compressed through a compression process are printed as the print data, data required to be converted into pixel data is used. In addition, the output data having the above-mentioned configuration are prepared by an operator of the application server 30 in a businesslike way, and are registered in the output-database 34.

In the contents providing system 1 according to the exemplary aspect, by supplying the output data (FIG. 3A) having the above-mentioned configuration from the application server 30 to the multifunction device 10, the multifunction device 10 performs the printing of the output data, whereby the print image (FIG. 3B) indicated by the output data is formed on a sheet.

The contents providing system 1 according to the exemplary aspect can allow a user to make an order based on the advertising image by the use of the multifunction device 10. That is, the advertising print data is constructed to describe the URL indicating an acquisition source of a request form in the advertising image having been printed, and the request form includes the condition ID and the advertising provider ID. The application server 30 stores the output data, which have the general print data indicating the request form but does not have any advertising print data, in the output-database 34.

For examples, the advertising image at the upper-left side in FIG. 3B is an advertisement for a trip to Hawaii, and an acquisition source URL of the output data indicating the request form shown in FIG. 3C is described in the advertising image. FIG. 3C shows a print image indicated by data returned from a query destination device *application server 30) when a query based on the URL is sent to the device corresponding to the URL (application server 30). A writing column for writing a designation of plan, an address, a name, the number of persons, and a departure time is provided as a request form for trip to Hawaii at the center of the print image.

The condition ID of the corresponding advertising image is described at the upper-right side of the print image, and a destination URL as a URL indicating a transmission source of the request form and an advertising provider ID as a source for providing the advertising image are described at the lower-left side of the print image. The user of the multifunction device 10 instructs the multifunction device 10 to print the output data indicating the print image shown in FIG. 3C, writes necessary details in the writing column of the printed sheet, instructs the readout unit 16 of the multifunction device 10 to read out the image of the printed sheet, and sends the image data indicating the readout result to the destination URL, thereby requesting for the trip to Hawaii.

In addition, the destination URL is an URL of the application server 30 as a destination. When an access to the destination URL exists, the application server 30 activates the program for receiving the request (order for a product) and accepts the request (of which the details are described later).

[2.3. Configuration of Aggregation Server]

The aggregation server 40 provides a service of aggregating and managing the amount of consumption of expendable items consumed when the multifunction device 10 prints the advertising image. The aggregation server 40 comprises a control unit 41, a communication unit 42, and a memory unit 43.

The control unit 41 is mainly composed of a micro computer including a CPU, a ROM, and a RAM and serves to comprehensively control the constituent elements of the aggregation server 40. The communication unit 42 performs a communication for transmitting and receiving data through the Internet 3. The memory unit 43 stores a variety of data in a hard disc.

The memory unit 43 stores a mail address table 44 (see FIG. 26) indicating electronic mail addresses of advertising providers to which the advertising provider IDs are assigned, an aggregation table 45 (see FIG. 22) which is at able for managing the aggregation result of the amount of consumption of expendable items, a first count table 46 (see FIG. 23) which is a table indicating a number of points of each coloring material (a value indicating an amount of money corresponding to the amount of coloring material for a pixel), and a second count table 47 (see FIG. 24) which is a table indicating a number of points of each sheet type (a value indicating an amount of money corresponding to a sheet).

[2.4. Configuration of Advertising Provider Server]

The advertising provider server 50 is managed by an advertising provider and comprises a control unit 51, a communication unit 52, and a memory unit 53.

The control unit 51 is mainly composed of a micro computer including a CPU, a ROM, and a RAM and serves to comprehensively control the constituent elements of the advertising provider server 50. The communication unit 52 performs a communication for transmitting and receiving data through the Internet 3. The memory unit 53 stores a variety of data in a hard disc. Specifically, similarly to the aggregation server 40, an aggregation table 54 which is a table for managing the aggregation result of the amount of consumption of expendable items is stored in a memory area of the memory unit 53.

[3. Description of Processes]

Next, processes performed by the control units 11, 31, 41, and 51 of the multifunction device 10, the application server 30, the aggregation server 40, and the advertising provider server 50 will be described.

[3.1. Multifunction device Operation]

Figure 4:
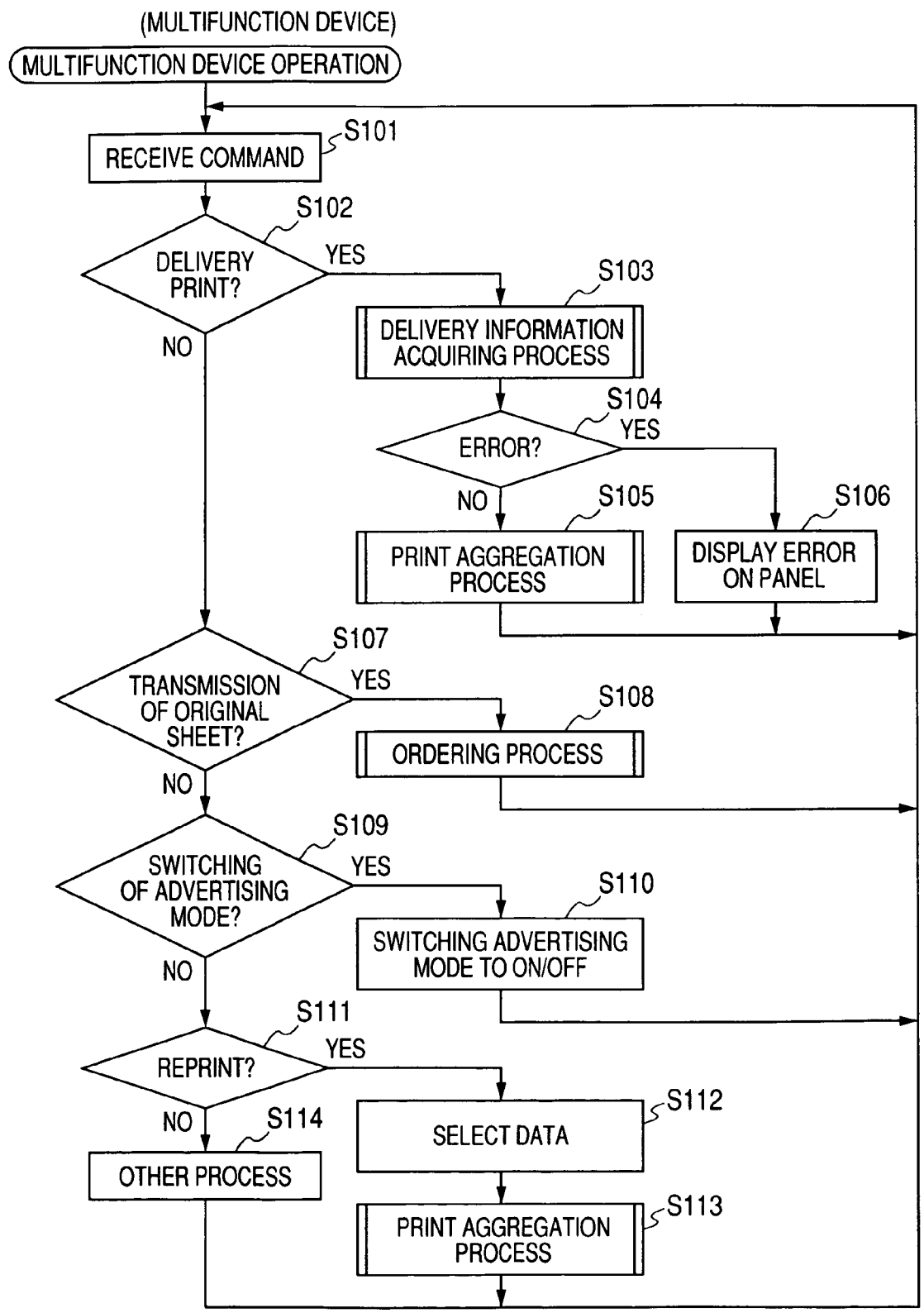
FIG. 4 is a flowchart illustrating a multifunction device operation performed by a control unit of a multifunction device.

First, a multifunction device operation performed by the control unit 11 of the multifunction device 10 is described with reference to the flowchart illustrated in FIG. 4. The multifunction device operation is started when the multifunction device 10 is turned on.

When the multifunction device operation is started, the control unit 11 waits in S101 until a command (instruction) is input externally. Examples of the externally input command can include a command input from a user by manipulating the keys in the manipulation unit 14 and a command input from a personal computer (not shown) which can communicate with the multifunction device 10.

When the command is input, the control unit 11 determines in S102 whether the input command is a delivery print command. The delivery print command is a command for instructing the multifunction device 10 to perform a process (a delivery print process) of acquiring output data specified by the user from the application server 30 and printing an image on the basis of the output data. The command is input from the user by means of the manipulation of keys in the manipulation unit 14.

When it is determined in S102 that the input command is the delivery print command, the control unit 11 performs a delivery information acquiring process (see FIG. 6) in S103. Details of the delivery information acquiring process will be described later, and a process of acquiring the output data specified by the user from the application server 30 is performed in the delivery information acquiring process.

When the delivery information acquiring process in S103 is finished, the control unit 11 determines in S104 whether the processing result of the delivery information acquiring process is an error. That is, the control unit determines whether the output data can be normally acquired from the application server 30 in the delivery information acquiring process.

When it is determined that the processing result of the delivery information acquiring process is not an error (when the output data can be acquired normally) (NO in S104), the control unit 11 performs a print aggregation process (see FIG. 7) in S105. Details of the print aggregation process will be described later and a process of aggregating the amount of expendable items consumed for printing an image based on the output data acquired in the delivery information acquiring process and printing an advertising image is performed in the print aggregation process. When the print aggregation process in S105 is finished, the control unit 11 waits in S101 until a next command is input.

On the other hand, when it is determined that the processing result of the delivery information acquiring process is an error (when the output data cannot be normally acquired) (YES in S104), the control unit 11 displays a message indicating an occurrence of an error on the display panel of the display unit 15 in S106. Thereafter, the control unit performs the process of S101.

When it is determined in S102 that the input command is not the delivery print command, the control unit 11 determines in S107 whether the command input in S101 is a sheet transmitting command. The sheet transmitting command is a command for allowing the readout unit 16 to read out a sheet (request form) for making an order for a product and instructing the multifunction device 101 to perform a process (transmission of the sheet) of transmitting the details thereof to the application server 30. The command is input from the user by means of manipulation of the keys in the manipulation unit 14.

When it is determined in S107 that the input command is the sheet transmitting command, the control unit 11 performs an ordering process (see FIG. 15) in S108. Details of the ordering process will be described later, and a process of reading out a sheet set in the readout unit 16 and transmitting the details thereof to the application server 30 is performed in the ordering process. When the ordering process in S108 is finished, the control unit 11 performs the process of S101 again.

When the command input in S101 is not the sheet transmitting command (NO in S107), the control unit 11 determines in S109 whether the command input in S101 is an advertising mode switching command. The advertising mode switching command is a command instructing an ON/OFF state of an advertising mode, and is input from the user by means of manipulation of the keys in the manipulation unit 14.

When it is determined that the command input in S101 is the advertising mode switching command (YES in S109), the control unit 11 switches the ON/OFF state of the advertising mode in S110. That is, when the advertising mode is set in the ON state, the control unit switches the advertising mode to the OFF state and when the advertising mode is set in the OFF state, the control unit switches the advertising mode to the ON state. Specifically, the control unit performs a process of rewriting advertising mode information 23 of the memory unit 20. When the process is finished, the control unit performs the process of S101 again. At the time of performing the above-mentioned delivery print or a reprint to be described later, the multifunction device 10 prints an image excluding the advertising image when the advertising mode is set in the OFF state, and prints an image including the advertising image when the advertising mode is set in the ON state.

When it is determined in S109 that the input command is not the advertising mode switching command, the control unit 11 determines in S111 whether the command input in S101 is a reprint command. Here, the reprint command is a command for instructing the multifunction device 10 to reprint an image based on the output data which are acquired and printed from the application server 30 by the multifunction device 10 in accordance with the delivery print command. The command is input from the user by means of manipulation of the keys in the manipulation unit 14.

When it is determined that the command input in S101 is the reprint command (YES in S111), the control unit 11 selects the output data to be reprinted in accordance with the instruction from the user in S112. As described later, the multifunction device 10 stores the output data, the image of which has been printed in accordance with the delivery print command, in the memory unit 20 as desired by the user (S516 and S517).

Figure 5:
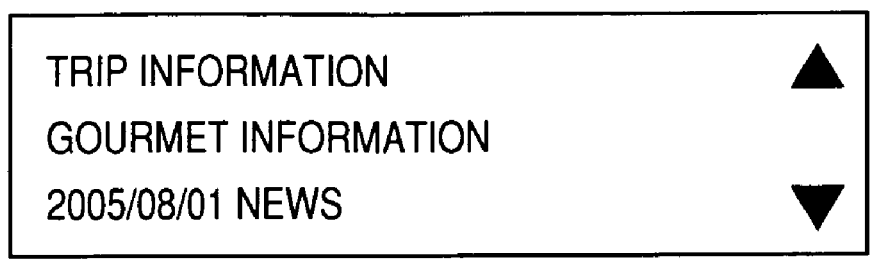
FIG. 5 is a front view illustrating a display panel on which a picture for allowing a user to designate output data for reprinting.

That is, in the process of S112, the control unit allows the user to specify the output data to be reprinted among the output data stored in the memory unit 20. Specifically, as shown in FIG. 5, the control unit displays the titles ("trip information", "gourmet information", and "Aug. 1, 2005 news" in the exemplary aspect) of the stored output data on the display panel of the display unit 15, and allows the user to select and determine the output data by means of manipulation of the keys.

When the process of S112 is finished, the control unit 11 performs in S113 a print aggregation process (see FIG. 7) like in S105, and aggregates the amount of expendable items consumed for printing an image based on the output data selected in S112 and printing the advertising image. Then, the control unit performs the process of S101 again.

On the other hand, when it is determined that the command input in S101 is not the reprint command (NO in S111), the control unit 11 performs other processes in accordance with the input command in S114. Thereafter, the control unit performs the process of S101 again.

[3.2. Delivery Information Acquiring Process]

Figure 6:
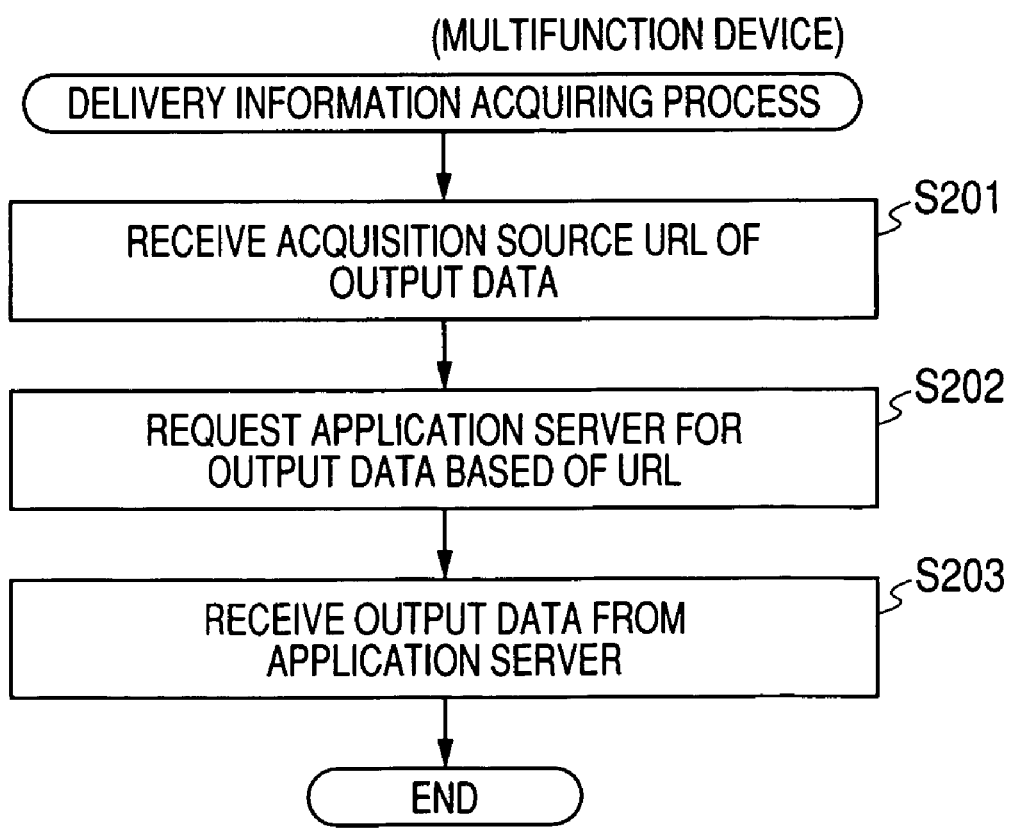
FIG. 6 is a flowchart illustrating a delivery information acquiring process performed by the control unit.

Next, the delivery information acquiring process performed in S103 in the multifunction device operation (FIG. 4) will be described with reference to the flowchart shown in FIG. 6.

When the delivery information acquiring process is started, the control unit 11 allows the user to specify an URL corresponding to the output data, an image of which the user wants to print, in S201. Specifically, the control unit displays an URL input picture on the display panel of the display unit 15, accepts the user's input manipulation of an URL by the use of the manipulation unit 14, and considers the URL input through the input manipulation as an URL specified by the user. In another method, the control unit displays a URL list stored in the memory unit 20 on the display panel of the display unit 15 and allows the user to select a desired URL from the list.

When an URL is specified by the user in S201, the control unit 11 requests in S202 the corresponding device (the application server 30 in the exemplary aspect) for the output data corresponding to the URL specified by the user by transmitting a query based on the URL to the device corresponding to the URL specified by the user. When the process is finished, the control unit receives in S203 the output data returned in response to the data request (transmission of a query) in S202. Thereafter, the control unit finishes the delivery information acquiring process.

[3.3. Print Aggregation Process]

Figure 7:
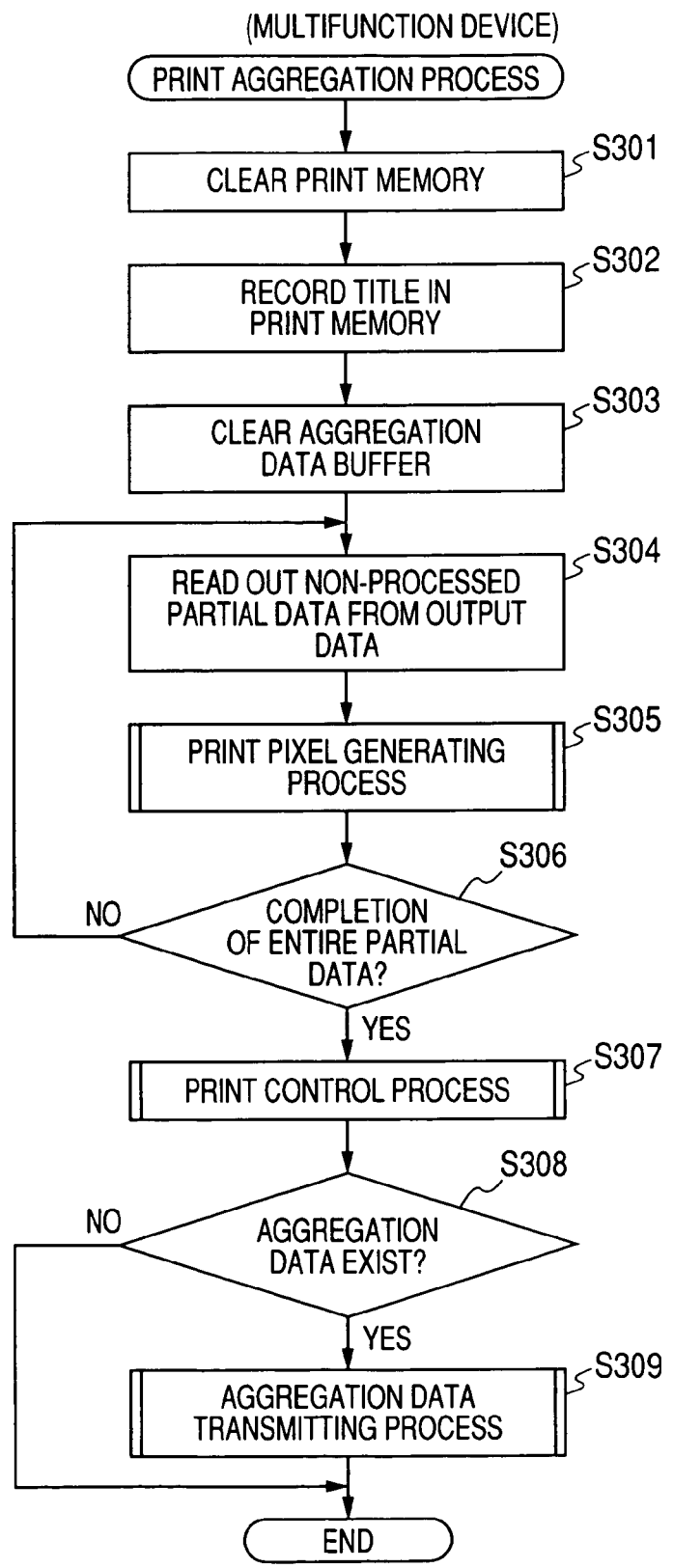
FIG. 7 is a flowchart illustrating a print aggregation process performed by the control unit.

Next, the print aggregation process performed in S105 and S113 of the multifunction device operation (FIG. 4) will be described with reference to the flowchart shown in FIG. 7.

Figure 9:
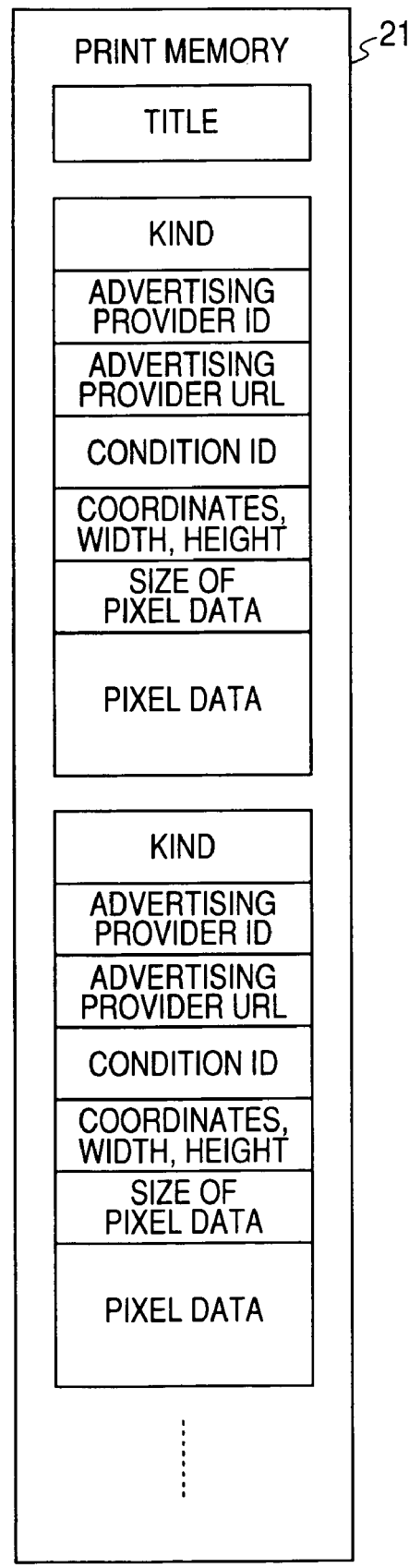
FIG. 9 is an explanatory diagram illustrating information stored in a print memory.

When the print aggregation process is started, the control unit 11 clears the print memory 21 of the memory unit 20 (S301) and stores in S302 the title of the output data to be processed in the print memory 21 of the memory unit 20 (see FIG. 9). Here, the output data to be processed means the output data received from the application serve 30 in S103 or the output data selected in S112.

When the process of S302 is finished, the control unit 11 clears the aggregation data buffer 22 of the memory unit 20 (S303), and then performs the process of S304. In S304, the control unit reads out non-processed partial data from the output data to be processed for the process of S305.

When the process is finished, the control unit 11 performs in S305 a print pixel generating process (see FIG. 8) which is a process of converting the print data described in the partial data readout in S304 into pixel data. Details of the print pixel generating process will be described later.

When the print pixel generating process in S305 is finished, the control unit 11 determines in S306 whether the print pixel generating process has been performed to all the partial data included in the output data to be processed. When it is determined that the print pixel generating process has not been performed to all the partial data included in the output data to be processed (NO in S306), the control unit performs the process of S304 again. Then, the control unit reads out non-processed partial data from the output data to be processed and performs the process of S305.

On the other hand, when it is determined in S306 that the print pixel generating process has been performed to all the partial data included in the output data to be processed, the control unit 11 performs a print control process (see FIG. 10) in S307. Details of the print control process will be described later, and aggregation data obtained by aggregating the amount of expendable items consumed for printing the image indicated by the pixel data and printing the advertising image aregenerated in the print control process.

When the process of S307 is finished, the control unit 11 determines in S308 whether the aggregation data (from which dummy aggregation data to be described later is excluded) has been generated in the print control process of S307. That is, the control unit determines whether the advertising image has been printed. When it is determined that the aggregation data has been generated (YES in S308), the control unit performs an aggregation data transmitting process for transmitting the aggregation data to the aggregation server 40 (S309). When the process is finished, the control unit finishes the print aggregation process. Details of the aggregation data transmitting process will be described later (see FIG. 14).

On the other hand, when it is determined that the aggregation data has not been generated, the control unit 11 ends the print aggregation process without performing the process of S309. That is, when the advertising mode is set in the OFF state, when the advertising image is not included in the print image indicated by the output data, or when the printing is stopped before the advertising image is printed, the advertising image is not printed. Accordingly, the aggregation data transmitting process is not performed.

[3.4. Print Pixel Generating Process]

Figure 8:
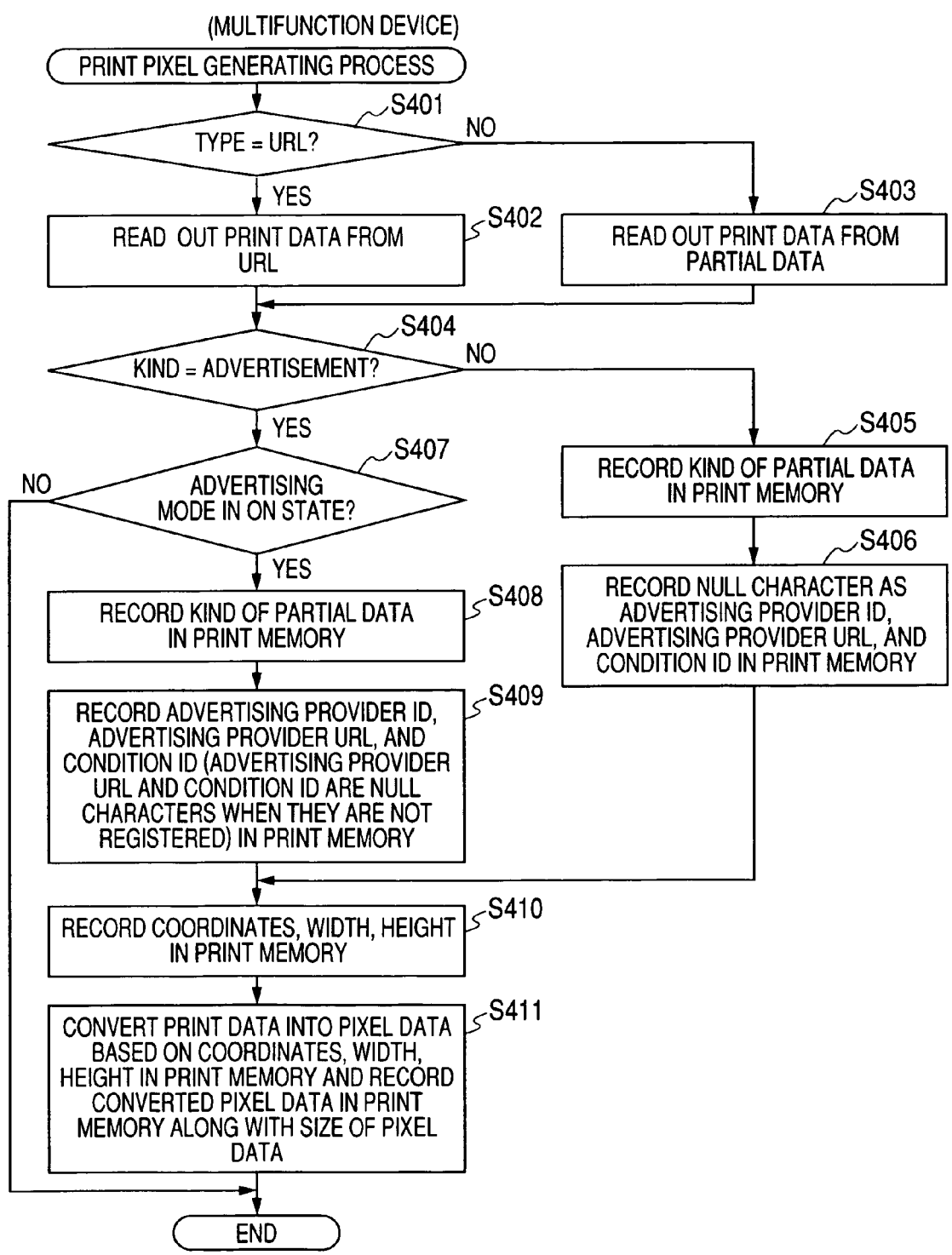
FIG. 8 is a flowchart illustrating a print pixel generating process performed by the control unit.

Next, the print pixel generating process performed in S305 in the print aggregation process (FIG. 7) will be described with reference to the flowchart shown in FIG. 8.

When the print pixel generating process is started, the control unit 11 first determines in S401 whether the type of the print data in the partial data to be processed (partial data read out in S304) is "URL." Specifically, the control unit determines whether the type of the print data described in the print data start tag (<print data type="***">) in the partial data is "URL."

When it is determined that the type of the print data is "URL" (YES in S401), the control unit acquires in S402 the print data from the destination of the URL through the Internet 3, on the basis of the URL described between the print data start tag (<print data type="URL">) and the print data end tag (</print data>). Thereafter, the control unit performs the process of S404.

On the other hand, when it is determined in S401 that the type of the print data is not "URL" (but "data"), the control unit 11 read out in S403 the print data described between the print data start tag and the print data end tag. Thereafter, the control unit performs the process of S404.

In S404, the control unit 11 determines whether the kind of the image in the partial data to be processed is "advertisement." Specifically, the control unit determines whether the kind of the image described in the partial data start tag (<partial data kind="**" coordinate x= . . . >) is "advertising."

When the kind of the image is not "advertisement" (but "general") (NO in S404), the control unit stores in S405 the kind of the image (in this case, "general") determined in S404 the print memory 21 of the memory unit 20 (see FIG. 9). Subsequently, in S406, the control unit records NULL characters as the advertising provider ID, the advertising provider URL, and the condition ID in the print memory 21 of the memory unit 20 (see FIG. 9). Thereafter, the control unit performs the process of S410.

On the other hand, when it is determined in S404 that the kind of the image is "advertisement", the control unit 11 determines in S407 whether the advertising mode is set in the ON state. Specifically, the control unit determines whether the advertising mode indicates the ON state by referring to the advertising mode information 23 in the memory unit 20.

When it is determined that the advertising mode is set in the ON state (YES in S407), the control unit records in S408 the kind of the image (in this case, "advertisement") determined in S404 in the print memory 21 of the memory unit 20 (see FIG. 9). Subsequently, in S409, the control unit records the advertising provider ID, the advertising provider URL, and the condition ID described in the partial data are written in the print memory 21 of the memory unit 20 (see FIG. 9). Thereafter, the control unit performs the process of S410. When the advertising provider URL and the condition ID are not described in the partial data, the control unit records NULL characters in the print memory 21 in S409.

In S410, the coordinates (coordinate x and coordinate y), the horizontal width, and the vertical length described in the partial data are stored in the print memory 21 of the memory unit 20 (see FIG. 9). Thereafter, in S411, the print data acquired (read out) in S402 or S403 are converted (developed) into pixel data on the basis of the coordinates, the horizontal width, and the vertical length stored in the print memory 21 in S410. The pixel data are stored in the print memory 21 along with the size of the pixel data (that is, the number pixels in the horizontal and vertical directions of the pixel data) (see FIG. 9). Thereafter, the print pixel generating process is finished.

On the other hand, when it is determined in S407 that the advertising mode is not set in the ON state (but in the OFF state), the control unit 11 ends the print pixel generating process without performing the processes of S408 to S411. In this case, the pixel data indicating the advertising image are not generated. Accordingly, when the printing is performed on the basis of the details stored in the print memory 21 in the print pixel generating process, only the residual image (general image) excluding the advertising image is printed on the sheet. For example, in case of the output data shown in FIG. 3A, only the residual image excluding the advertising image at the upper-left side and the advertising image at the lower-right side from the print image shown in FIG. 3B is printed.

Since the print pixel generating process is performed to all the partial data included in the output data in the above-mentioned print aggregation process (FIG. 7) (S304 to S306), the title of the output data, the pixel data corresponding to the partial data, the image of which has been printed, among the partial data of the output data, and a variety of information are stored in the print memory 21 of the memory unit 20, as shown in FIG. 9.

[3.5. Print Control Process]

Figure 10:
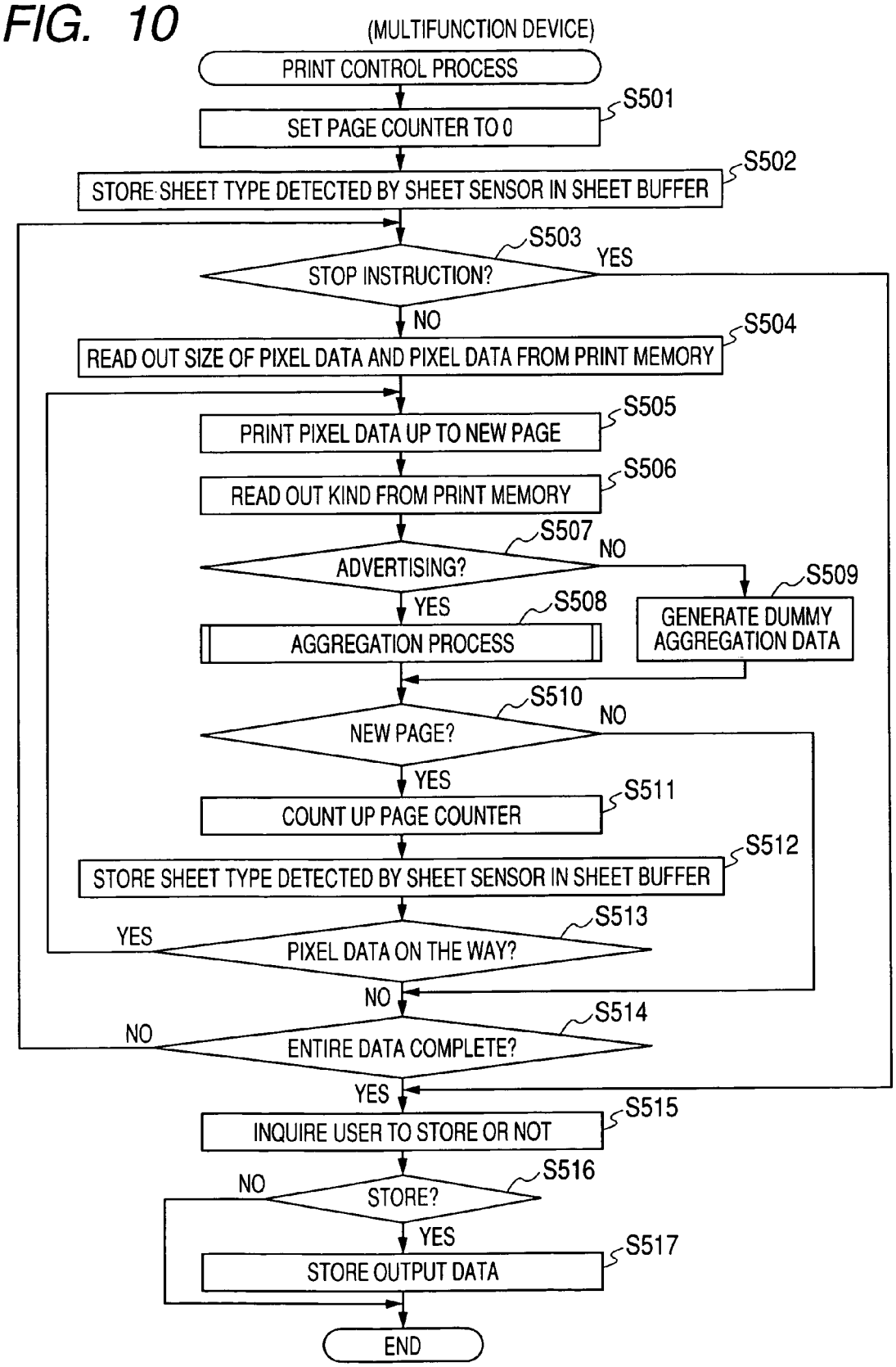
FIG. 10 is a flowchart illustrating a print control process performed by the control unit.

Next, the print control process performed in S307 in the print aggregation process (FIG. 7) will be described with reference to the flowchart shown in FIG. 10.

When the print control process is started, the control unit 11 first sets a page counter for counting the number of printing sheets to 0 in S501. When the process is finished, the control unit performs a sheet feed process by driving the sheet feed unit and stores the sheet type (the sheet type of the sheet on which the image is printed) detected by the sheet sensor of the printout unit 17 in a sheet buffer (not shown) of the memory unit 20 in S502. When the process of S502 is finished, the control unit determines whether a stop command for stopping the printing is input (S503). The stop command is input from the user by means of manipulation of a predetermined key in the manipulation unit 14.

When it is determined that the stop command is not input (NO in S503), the control unit selects pixel data having not been subjected yet to the printing among the pixel data stored in the print memory 21 of the memory unit 20 and reads out the size of the pixel data and the pixel data in S504. When this process is finished, the control unit prints in S505 the image indicated by the pixel data read out in S504. However, when the image is beyond a print area of the sheet, only the portion which can be printed on the sheet is printed.

When the process of S505 is finished, the control unit 11 reads out the kind of the image printed in S505 from the print memory 21 of the memory unit 20 (S506) and determines whether the kind of the image read out is "advertisement" (S507). When it is determined that the kind of the image is "advertisement" (YES in S507), the control unit performs in S508 the aggregation process (see FIG. 12). Details of the aggregation process will be described later, and in the aggregation process, the aggregation data obtained by aggregating the amount of expendable items consumed for printing the advertising image in a unit of sheet (page) are generated and are stored in the aggregation data buffer 22. When this process is finished, the control unit performs the process of S510.

On the other hand, when it is determined in S507 that the kind of the image is not "advertisement" (but "general"), the control unit 11 generates in S509 dummy aggregation data indicating that an image (general image) other than the advertising image is printed, stores the dummy aggregation data in the aggregation data buffer 22, and then performs the process of S510. Here, the dummy aggregation data are data in which one unit is set from the aggregation data start tag (<aggregation data type="dummy">) to the aggregation data end tag (</aggregation data>), as shown in FIG. 11. "Dummy" is described as type of the aggregation data and the value of the page counter is described as a page number.

In S510, the control unit determines whether the page break should be performed. Specifically, when the image printed in S505 is not contained in the print area of a sheet or when the printed image is exactly contained in the print area of the sheet (when the print area is not left), it is determined that the page break should be performed. When it is determined that the page break should be performed (YES in S510), the control unit counts up the page counter in S511.

When the process of S511 is finished, the control unit 11 performs in S512 a process of feeding a sheet and a process of discharging the printed sheet by driving the sheet feed unit and the discharge unit, and stores the sheet type of a new sheet (the sheet type of the sheet on which the image will be printed) detected by the sheet sensor of the printout unit 17 in the sheet buffer of the memory unit 20. Thereafter, the control unit performs the process of S513.

In S513, the control unit 11 determines whether the printing of the image corresponding to the pixel data read out in S504 is on the way. That is, the control unit determines whether the image printed in S505 is not contained in the print area of the sheet.

When it is determined that the printing of the image corresponding to the pixel data read out in S504 (YES in S513) is on the way, the control unit renews the printing of the image corresponding to the pixel data read out in S504 from the way.

On the other hand, when it is determined in S513 that the printing of the image is not on the way (when the image printed in S505 is exactly contained in the print area of the sheet), the control unit 11 performs the process of S514. When it is determined in S510 that the page break should not be performed, the control unit also performs the process of S514.

In S514, the control unit 11 determines whether the printing operation is performed to all the pixel data stored in the print memory 21 of the memory unit 20. When it is determined that the printing operation is not performed to all the pixel data (NO in S514), the control unit performs the process of S503.

On the other hand, when it is determined in S514 that the printing is performed to all the pixel data, the control unit 11 inquires of the user whether it is necessary to store the output data in S515. Specifically, the control unit displays a message inquiring whether the output data should be stored on the display panel of the display unit 15. When this process is finished, the control unit 11 determines (S516) whether the output data should be stored on the basis of an instruction input from the user by means of the manipulation of the keys in the manipulation unit 14 in response to the inquiry in S515.

When it is determined that the output data should be stored (YES in S516), the control unit stores in S517 the output data in the memory unit 20 (an area other than temporary memory area). Thereafter, the control unit ends the print control process.

On the other hand, when it is determined in S516 that the output data need not be stored, the control unit ends the print control process without performing the process of S517.

In the print control process, the printing of an image is performed on the basis of the pixel data and the information stored in the print memory 21 of the memory unit 20 and the aggregation process is performed to the advertising image. Specifically, in the print control process, the aggregation process (S508) is performed in a unit of pixel data. Accordingly, even when the printing is stopped on the way, the aggregation process can be performed to the printed image and cannot be performed to the non-printed image.

[3.6. Aggregation Process]

Figure 12:
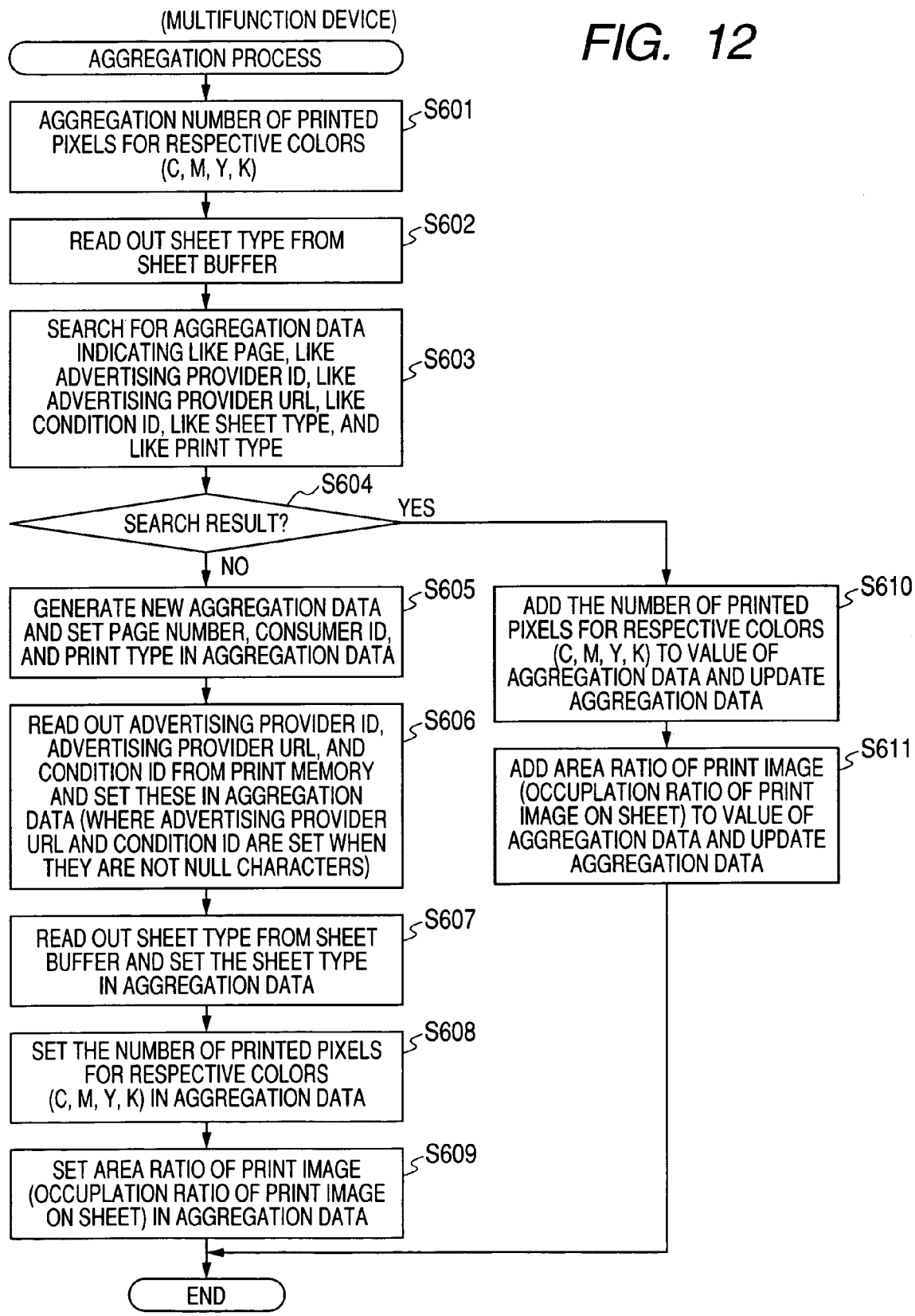
FIG. 12 is a flowchart illustrating an aggregation process performed by the control unit.

Next, the aggregation process performed in S508 in the print control process (FIG. 10) will be described with reference to the flowchart shown in FIG. 12.

When the aggregation process is started, the control unit 11 analyzes the pixel data supplied for printing to aggregate the number of pixels printed on the sheet in S505 every color (each of cyan (C), magenta (M), yellow (Y), and black (K) in the exemplary aspect) (S601) and reads out the sheet type stored in the sheet buffer (S602).

The control unit searches the aggregation data buffer 22 for the aggregation data indicating the same advertising provider ID, advertising provider URL, and condition ID as the advertising provider ID, the advertising provider URL, and the condition ID stored in the print memory 21 to correspond to the pixel data indicating the pixels (advertising image) printed on the sheet in S505, in which the aggregation data indicate the same page number as the value of the page counter, the same print type as the print type stored in the memory unit 20, and the same sheet type as the sheet type stored in the sheet buffer (S603).

FIGS. 13A and 13B are diagrams illustrating a configuration of the aggregation data stored in the aggregation data buffer 22. In the exemplary aspect, the aggregation data are data which are described in a markup language and in which one unit is set from the aggregation data start tag (<aggregation data>) to the aggregation data end tag (</aggregation data>).

In the aggregation data, the page number, the consumer ID, the advertising provider ID, the advertising provider URL, the condition ID, the sheet type, the amount of consumption of sheets, the print type, and the amount of consumption of respective coloring materials (cyan (C), magenta (M), yellow (Y), and black (K) in the exemplary aspect) are described between the aggregation data start tag and the aggregation data end tag.

Specifically, the page number described in the aggregation data indicates the page number of the sheet on which the advertising image is printed. The page number is described between a page number start tag () and a page number end tag () in the aggregation data.

The consumer ID described in the aggregation data indicates the consumer ID assigned (stored) to the multifunction device 10 having generated the aggregation data. The consumer ID is described between a consumer ID start tag (<consumer ID>) and a consumer ID end tag (</consumer ID>) in the aggregation data.

The advertising provider ID described in the aggregation data indicates the advertising provider ID of the advertising provider as a source for providing the advertising image. The advertising provider ID is described between an advertising provider ID start tag (<advertising provider ID>) and an advertising provider ID end tag (</advertising provider ID>) in the aggregation data.

The advertising provider URL described in the aggregation data indicates the advertising provider URL corresponding to the advertising image. The advertising provider URL is described between an advertising provider URL start tag (<advertising provider URL>) and an advertising provider URL end tag (</advertising provider URL>) in the aggregation data. As described above, since the advertising provider URL may not be described in the advertising data indicating the advertising image, the advertising provider URL is not described exceptionally in the aggregation data for the advertising image corresponding to the advertising data (see FIG. 13B).

The condition ID described in the aggregation data indicates the condition ID assigned to the advertising image. The condition ID is described between a condition ID start tag (<condition ID>) and a condition ID end tag (</condition ID>) in the aggregation data. Since the condition ID may not be described in the advertising data indicating the advertising image, the condition ID is not described exceptionally in the aggregation data for the advertising image corresponding to the advertising data (see FIG. 13B).

The sheet type described in the aggregation data indicates the sheet type of the sheet on which the advertising image is printed. The sheet type is described between a sheet type start tag (<sheet type>) and a sheet type end tag (</sheet type>) in the aggregation data.

The amount of consumption of sheets described in the aggregation data indicates the amount of consumption of sheets used for printing the advertising image, that is, an occupation ratio of the advertising image to the sheet in a unit of sheet number with respect to the whole print area in the sheet. The amount of consumption of sheets is described between a sheet number start tag (<sheet number>) and a sheet number end tag (</sheet number>) in the aggregation data. The amount of consumption of sheets described in the aggregation data is not an integer but a real number.

The amounts of consumption of coloring materials described in the aggregation data indicates the amounts of consumption of coloring materials used for printing the advertising image in a unit of pixels (that is, number of pixels). The amount of consumption of cyan coloring material is described between a cyan start tag (<C>) and a cyan end tag (</C>), the amount of consumption of magenta coloring material is described between a magenta start tag (<M>) and a magenta end tag (</M>), the amount of consumption of yellow coloring material is described between a yellow start tag (<Y>) and a yellow end tag (</Y>), and the amount of consumption of black coloring material is described between a black start tag (<K>) and a black end tag (</K>).

In S603, when the above-mentioned search process is finished, the control unit 11 determines in S604 whether the corresponding aggregation data (aggregation data to be searched out) have been searched out of the aggregation data buffer 22 in the search process. When it is determined that the aggregation data have not been searched out (NO in S604), the control unit generates in S605 new aggregation data in which the aggregation data start tag and the aggregation data end tag are described and stores the new aggregation data in the aggregation data buffer 22.

When this process is finished, the control unit 11 records a value of the page counter as a page number between the aggregation data start tag and the aggregation data end tag in the newly generated aggregation data along with the page number start tag and the page number end tag, so as to match with the format of the aggregation data. The control unit records the consumer ID stored in the memory unit 20 between the aggregation data start tag and the aggregation data end tag in the newly generated aggregation data along the consumer ID start tag and the consumer ID end tag, and records the print type stored in the memory unit 20 along with the print type start tag and the print type end tag.

When the process of S605 is finished, the control unit 11 reads out in S606 the advertising provider ID, the advertising provider URL, and the condition ID stored in the print memory 21 to correspond to the pixel data indicating the advertising image previously printed on the sheet in S505 from the print memory 21.

The read-out advertising provider ID is described between the aggregation data start tag and the aggregation data end tag in the newly generated aggregation data along with the advertising provider ID start tag and the advertising provider ID end tag. When the read-out advertising provider URL is not a NULL character, the read-out advertising provider URL is described between the aggregation data start tag and the aggregation data end tag in the newly generated aggregation data along with the advertising provider URL start tag and the advertising provider URL end tag. When the read-out condition ID is not a NULL character, the read-out condition ID is described between the aggregation data start tag and the aggregation data end tag in the newly generated aggregation data along with the condition ID start tag and the condition ID end tag.

When the process of S606 is finished, the control unit 11 reads out in S607 the sheet type stored in the sheet buffer and stores the read-out sheet type between the aggregation data start tag and the aggregation data end tag in the newly generated aggregation data along with the sheet type start tag and the sheet type end tag.

When the process of S607 is finished, the control unit 11 considers in S608 the number of pixels of each coloring material aggregated in S601 as the amount of consumption of a corresponding coloring material, and records the number of pixels between the aggregation data start tag and the aggregation data end tag in the newly generated aggregation data along with the corresponding tags.

That is, the number of printed cyan pixels is described in the newly generated aggregation data along with the cyan start tag and the cyan end tag, the number of printed magenta pixels is described in the newly generated aggregation data along with the magenta start tag and the magenta end tag, the number of printed yellow pixels is described in the newly generated aggregation data along with the yellow start tag and the yellow end tag, and the number of printed black pixels is described in the newly generated aggregation data along with the black start tag and the black end tag.

When the process of S608 is finished, the control unit 11 calculates in S609 the occupation ratio R of the advertising image formed on the sheet with respect to an area R0 of the print area of the sheet on which the advertising image is previously printed in S505. That is, when the area of the advertising image including the group of pixels formed on the sheet is R1, R=R1÷R0 is calculated as the occupation ratio. The calculated occupation ratio R is described as the amount of consumption of sheets between the aggregation data start tag and the aggregation data end tag in the newly generated aggregation data along with the sheet number start tag and the sheet number end tag. When the process of S609 is finished, the control unit ends the aggregation process.

On the other hand, when it is determined in S604 that the corresponding aggregation data (aggregation data to be searched out) have been searched out of the aggregation data buffer 22, the control unit 11 reads out in S610 the amount of consumption of each coloring material from the searched aggregation data (aggregation data to be searched out). The control unit adds the number of pixels for each color aggregated in S601 to the read-out amount of consumption of each coloring material (the number of pixels) and writes the addition result over the searched-for aggregation data as the amount of consumption of each coloring material.

That is, the control unit updates the amount of consumption of cyan coloring material indicated by the aggregation data by adding the number of cyan pixels aggregated in S601 to the amount of consumption of cyan coloring material read out of the aggregation data searched out as the search result and rewriting the addition result between the cyan start tag and the cyan end tag in the aggregation data searched out as the search result.

The control unit updates the amount of consumption of magenta coloring material indicated by the aggregation data by adding the number of magenta pixels aggregated in S601 to the amount of consumption of magenta coloring material read out of the aggregation data and rewriting the addition result between the magenta start tag and the magenta end tag in the aggregation data of a reading source.

The control unit updates the amount of consumption of yellow coloring material indicated by the aggregation data by adding the number of yellow pixels aggregated in S601 to the amount of consumption of yellow coloring material read out of the aggregation data and rewriting the addition result between the yellow start tag and the yellow end tag in the aggregation data of the reading source. The control unit updates the amount of consumption of black coloring material indicated by the aggregation data by adding the number of black pixels aggregated in S601 to the amount of consumption of black coloring material read out of the aggregation data and rewriting the addition result between the black start tag and the black end tag in the aggregation data of the reading source.

When the process of S610 is finished, the control unit 11 calculates in S611 the occupation ratio R of the advertising image formed on the sheet with respect to the area R0 of the print area of the sheet on which the advertising image is previously printed in S505, similarly to the process of S609.

The control unit reads out the amount of consumption of sheets from the aggregation data searched out as the search result, adds the calculated occupation ratio R to the read-out amount of consumption of sheets, and rewrites the addition result as the amount of consumption of sheets over the aggregation data searched out as the search result. In this way, in S611, the amount of consumption of sheets indicated by the aggregation data searched out as the search result is updated. When this process is finished, the control unit 11 ends the aggregation process.

In the exemplary aspect, the control unit stores the aggregation data (data indicating the amounts of coloring materials and sheets required for printing the advertising image) in the aggregation data buffer 22 every sheet (page), every advertising provider, every advertising provider URL, and every condition ID in the aggregation process.

[3.7. Aggregation Data Transmitting Process]

Figure 14:
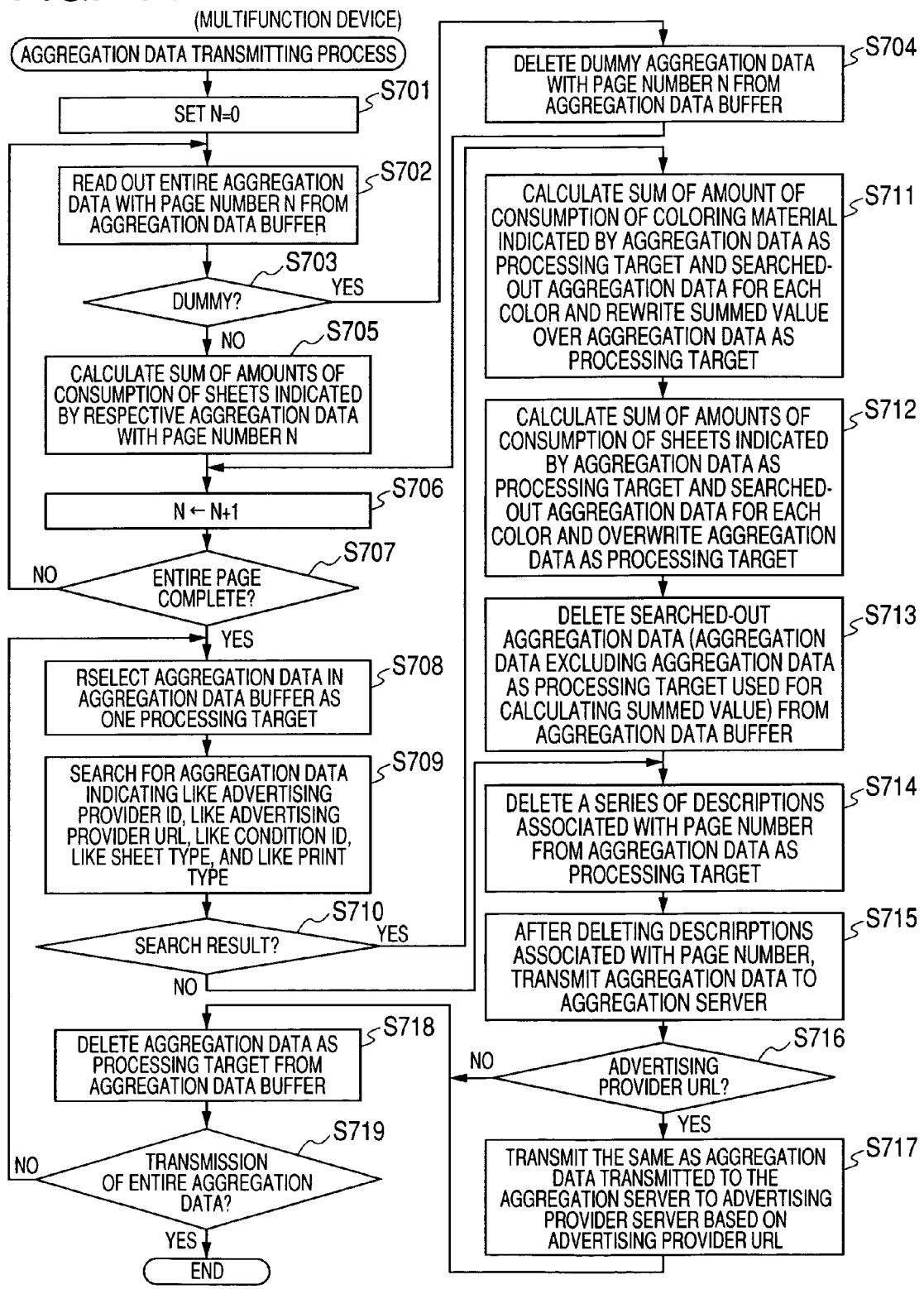
FIG. 14 is a flowchart illustrating an aggregation data transmitting process performed by the control unit.

Next, the aggregation data transmitting process performed in S309 in the print aggregation process (FIG. 7) will be described with reference to the flowchart shown in FIG. 14.

When the aggregation data transmitting process is started, the control unit 11 sets N=0 and reads out all the aggregation data in which the page number is a value "N" from the aggregation data buffer 22 in S701. The control unit determines whether the above-mentioned dummy aggregation data exist in the read-out aggregation data group (S703). When it is determined that the dummy aggregation data exist (YES in S703), the control unit performs the process of S704. In S704, the control unit deletes all the dummy aggregation data in which the page number is the value "N" from the aggregation data buffer 22. Thereafter, the control unit performs the process of S706.

On the other hand, when it is determined that the dummy aggregation data do not exist in the read-out aggregation data group, the control unit 11 calculates the sum G0 of the amounts of consumption of sheets indicated by the aggregation data in which the read-out page number is the value "N", dividing the amount of consumption g of sheets indicated by the aggregation data by the calculated sum G0 every read-out aggregation data, and rewrites the division result G=g÷G0 as the amount of consumption of sheets over the corresponding aggregation data in the aggregation data (S705). Accordingly, the control unit updates the amount of consumption of sheets indicated by the respective aggregation data in which the page number is the value "N."

For example, when aggregation data indicating the amount of consumption of sheets g1 and aggregation data indicating the amount of consumption of sheets g2 exist as the aggregation data in which the page number is the value "N", the value g1 of the aggregation data indicating the amount of consumption of sheets g1 stored in the aggregation data buffer 22 is updated with a value "g1÷(g1+g2)" and the value g2 of the aggregation data indicating the amount of consumption of sheets g2 stored in the aggregation data buffer 22 is updated with a value "g2÷(g1+g2)."

That is, in the exemplary aspect, when the dummy aggregation data does not exist in the read-out aggregation data group, only the advertising image is formed on the sheet of which the page number is N. Accordingly, by updating the amount of consumption g indicated by replacing the respective aggregation data in which the page number is the value N with the value G, the amount of consumption of sheets indicated by the respective aggregation data in which the page number is the value N is replaced with the value indicating the area ratio of the corresponding advertising image with respect to the total area of the advertising images on the sheet, the value indicating the occupation ratio of the corresponding advertising image in the print area of the sheet. When only the advertising image is formed on the entire sheet, this process is performed so as for the aggregation server 40 to estimate the cost for the sheet required for printing the advertising image including the blank portion in the print area in which no image is printed. When the process of S705 is finished, the control unit 11 performs the process of S706.

In S706, the control unit 11 adds 1 to the value of a parameter N (N←N+1), searches the aggregation data buffer 22 for the aggregation data, in which the page number is the value "N", by the use of the added value of the parameter "N", and determines whether the processes posterior to S702 has been performed to the aggregation data corresponding to the entire pages on the basis of the search result (S707). When the aggregation data in which the page number is the value "N" exists in the aggregation data buffer 22, the control unit determines that the processes posterior to S702 have not been performed to the aggregation data corresponding to the entire pages (NO in S707), and then performs the process of S702.

On the other hand, when the aggregation data in which the page number is the value "N" does not exist in the aggregation data buffer 22, the control unit determines that the processes posterior to S702 have been performed to the aggregation data corresponding to the entire pages (YES in S707), and then performs the process of S708.

In S708, the control unit 11 selects aggregation data as a processing target from the aggregation data group stored in the aggregation data buffer 22 and searches the aggregation data buffer 22 for the same advertising provider ID, advertising provider URL, condition ID, sheet type, and print type as the advertising provider ID, advertising provider URL, condition ID, sheet type, and print type indicated by the selected aggregation data as the processing target (S709). However, the aggregation data as the processing target are not included in the search target.

When the above-mentioned search process is completely performed in S709, the control unit 11 determines in S710 whether the aggregation data as the search target have been searched out in the aggregation data buffer 22 through the search process. When it is determined the aggregation data as the search target have not been searched out (NO in S710), the control unit deletes a series of descriptions from the page number start tag to the page number end tag from the aggregation data as the processing target in the aggregation data buffer 22 in S714. After deleting the series of descriptions for the page number, the control unit transmits the aggregation data as the processing target to the aggregation server 40 through the Internet 3 (S715). When this process is finished, the control unit performs the process of S716.

On the other hand, when it is determined in S710 that the aggregation data as the search target have been search out of the aggregation data buffer 22, the control unit 11 aggregates the amount of consumption of each coloring material indicated by the aggregation data as the processing target and the aggregation data searched out as the search result and calculates the sum of the amounts of consumption of the coloring materials (S711). The control unit records the calculated sum of the amounts of consumption of the coloring materials over the amount of consumption of the respective coloring materials in the aggregation data as the processing target. Accordingly, the control unit updates the amount of consumption of the respective coloring materials indicated by the aggregation data as the processing target.

That is, in S711, the control unit sums the amounts of consumption of the cyan coloring material indicated by the aggregation data as the processing target and the aggregation data searched out as the search result, writes the summed value as the amount of consumption of the cyan coloring material over the aggregation data as the processing target in the aggregation data buffer 22, and replaces the amount of consumption of the cyan coloring material indicated by the aggregation data as the processing target with the summed value.

In S711, the control unit sums the amounts of consumption of the magenta coloring material indicated by the aggregation data as the processing target and the aggregation data searched out as the search result, writes the summed value as the amount of consumption of the magenta coloring material over the aggregation data as the processing target in the aggregation data buffer 22, and replaces the amount of consumption of the magenta coloring material indicated by the aggregation data as the processing target with the summed value.

In S711, the control unit sums the amounts of consumption of the yellow coloring material indicated by the aggregation data as the processing target and the aggregation data searched out as the search result, writes the summed value as the amount of consumption of the yellow coloring material over the aggregation data as the processing target in the aggregation data buffer 22, and replaces the amount of consumption of the yellow coloring material indicated by the aggregation data as the processing target with the summed value.

In S711, the control unit sums the amounts of consumption of the black coloring material indicated by the aggregation data as the processing target and the aggregation data searched out as the search result, writes the summed value as the amount of consumption of the black coloring material over the aggregation data as the processing target in the aggregation data buffer 22, and replaces the amount of consumption of the black coloring material indicated by the aggregation data as the processing target with the summed value.

When the process of S711 is finished, the control unit 11 sums the amounts of consumption of sheets indicated by the aggregation data as the processing target and the aggregation data searched out as the search result (S712). Then, the control unit writes the summed value as the amount of consumption of sheets over the aggregation data as the processing target in the aggregation data buffer 22, and replaces the amount of consumption of sheets indicated by the aggregation data as the processing target with the summed value.

When the process of S712 is finished, the control unit 11 deletes all the aggregation data searched out as the search result from the aggregation data buffer 22 (S713). When this process is finished, the control unit 11 deletes a series of descriptions from the page number start tag to the page number end tag from the aggregation data as the processing target. After deleting the series of descriptions about the page number, the control unit transmits the aggregation data as the processing target to the aggregation server 40 through the Internet 3 (S715). When this process is finished, the control unit performs the process of S716.

In S716, the control unit 11 determines whether the advertising provider URL is described in the aggregation data transmitted in S715. When it is determined that the advertising provider ID is described (YES in S716), the control unit transmits the same data s the aggregation data transmitted in S715 to the destination of the advertising provider URL (the advertising provider server 50) indicated by the aggregation data (S717). Thereafter, the control unit performs the process of S718.

On the other hand, when it is determined that the advertising provider URL is not described in the aggregation data transmitted in S715 (NO in S716), the control unit 11 performs the process of S718 without performing the process of S717. In S718, the control unit 11 deletes the transmitted aggregation data as the processing target from the aggregation data buffer 22 and then performs the process of S719.

In S719, the control unit determines whether the processes in S708 and thereafter have been performed to the entire aggregation data. Specifically, the control unit determines whether the aggregation data are stored in the aggregation data buffer 22.

When it is determined that the processes posterior to S708 have not been performed to the entire aggregation data (NO in S719), the control unit performs the process of S708. When it is determined that the processes posterior to S708 have been performed to the entire aggregation data (YES in S719), the control unit ends the aggregation data transmitting process.

In the exemplary aspect, the aggregation data by sheets (by pages) stored in the aggregation data buffer 22 are arranged and transmitted to the aggregation server 40 and the advertising provider server 50 in the aggregation data transmitting process.

[3.8. Ordering Process]

Figure 15:
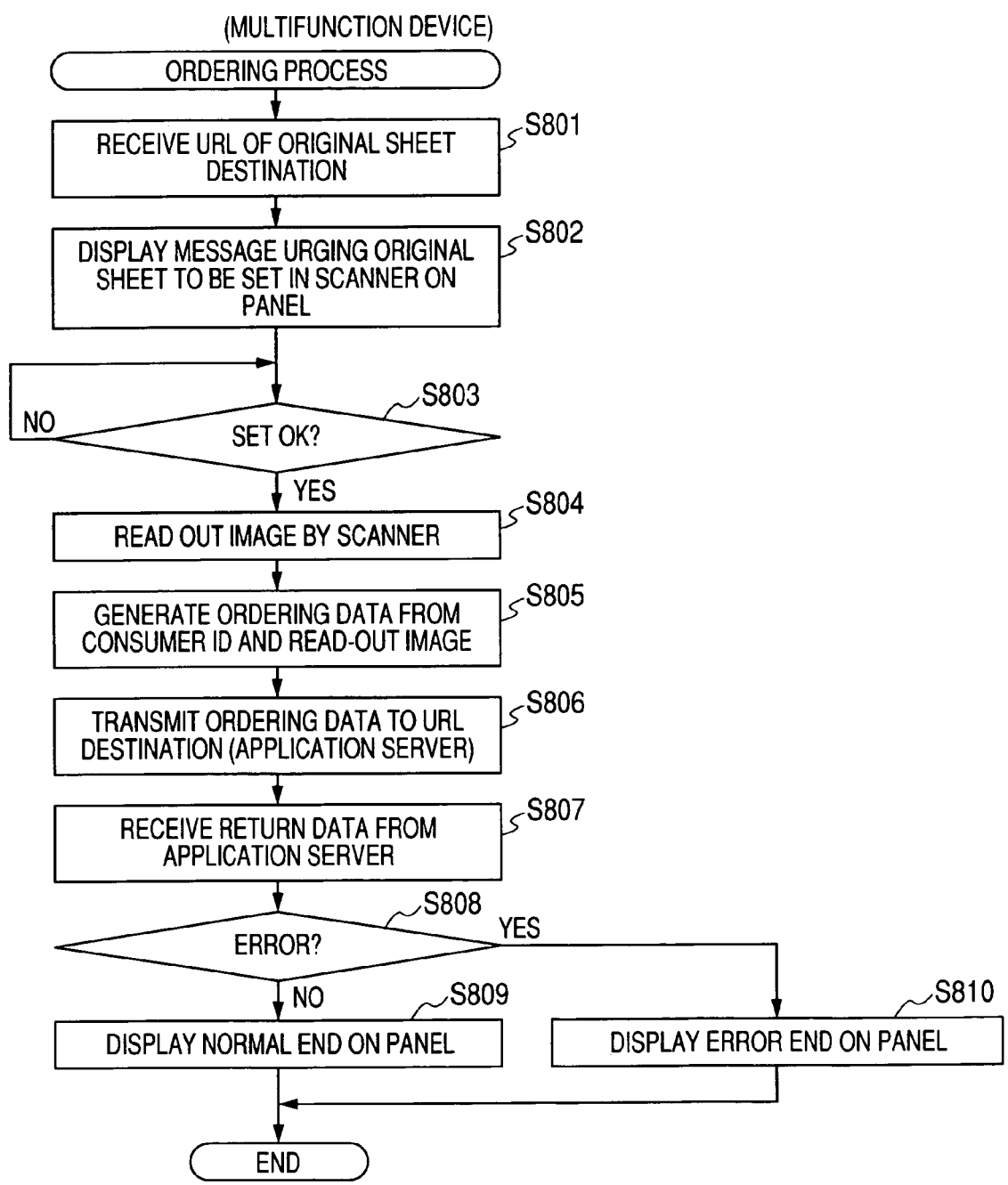
FIG. 15 is a flowchart illustrating an ordering process performed by the control unit.

Next, the ordering process performed in S108 in the multifunction device operation (FIG. 4) will be described with reference to the flowchart shown in FIG. 15.

When the ordering process is started, the control unit 11 allows a user to specify a destination URL of an original document (request form) in S801. Specifically, similarly to the process of S201, the control unit displays an URL input picture on the display pane 1 of the display unit 15, receives a manipulation for inputting an URL from the user, and considers the URL input through the input manipulation as the URL specified by the user.

When the URL is specified by the user, the control unit 11 displays a message indicating that the original document (request form), to which essential details are written is set on the readout unit 16, on the display panel of the display unit 15 (S802). The control unit determines whether the user set the original document on the readout unit 16 (S803). When it is determined that the original document is set, the control unit performs the process of S804. Specifically, when a predetermined key in the manipulation unit 14 is manipulated, it is determined that the original document is set.

In S804, the control unit 11 performs a process of reading out an image from the original document set on the readout unit 16. Thereafter, the control unit generates image data indicating the image (image of the request form) read out in S804 and ordering data including the consumer ID stored in the memory unit 20 are generated (S805).

When the ordering data are generated, the control unit 11 transmits the ordering data generated in S805 to the destination of the URL (application server 30) specified by the user in S801 (S806). When this process is finished, the control unit receives return data transmitted from the destination of the URL (application server 30) in S807.

When receiving the return data, the control unit determines whether the received return data indicate an error (S808). When it is determined that the return data do not indicate an error (NO in S808), the control unit displays a message indicating a normal end on the display panel of the display unit 15 in S809. Thereafter, the control unit ends the ordering process.

On the other hand, when it is determined that the return data indicate an error (YES in S808), the control unit 11 displays a message indicating an error end on the display panel of the display unit 15 in S810. Thereafter, the control unit ends the ordering process.

[3.9. Application Server Operation]

Figure 16:
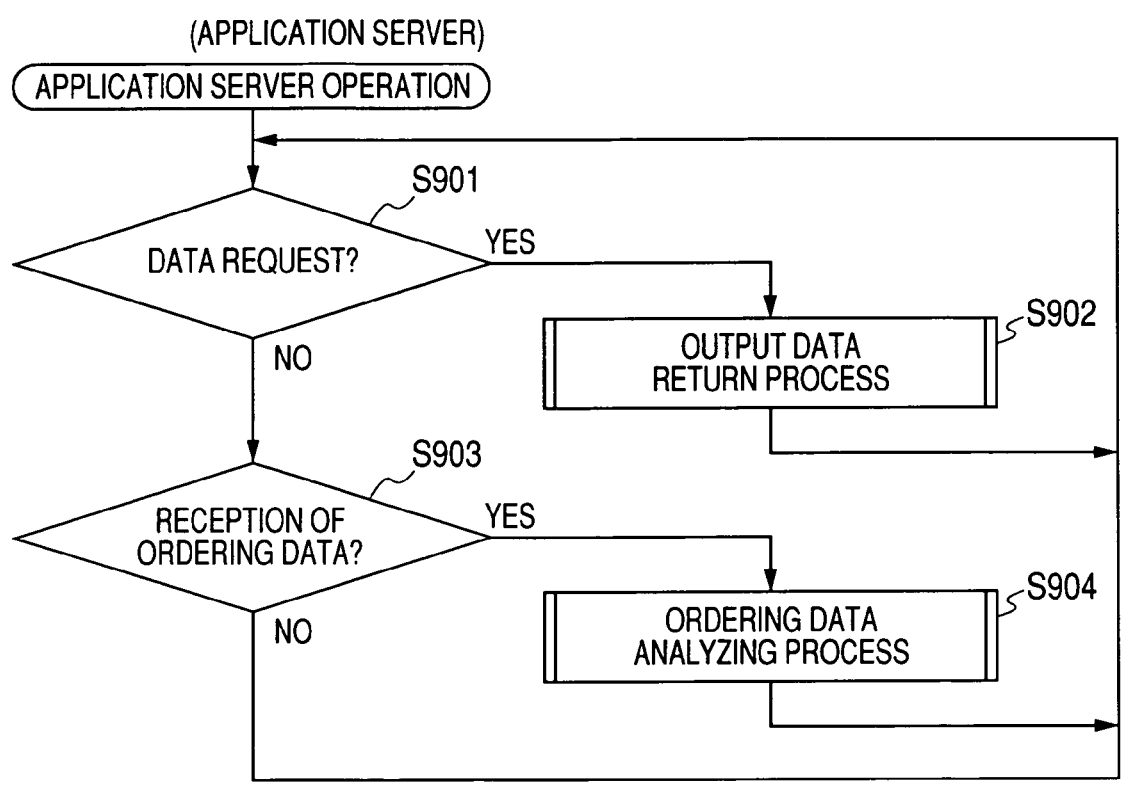
FIG. 16 is a flowchart illustrating an application server operation performed by a control unit of the application server.

Subsequently, an application server operation performed by the control unit 31 of the application server 30 will be described with reference to the flowchart shown in FIG. 16. The application server operation is started when the application server 30 is turned on.

When the application server operation is started, the control unit 31 determines in S901 whether a query as a data request signal has been received through the Internet 3. When it is determined that the query has not been received (NO in S901), the control unit performs the process of S903. In S903, the control unit determines whether the ordering data has been received through the Internet 3. When it is determined that the ordering data has not been received, the control unit waits in S901 until receiving the query or receiving the ordering data.

When it is determined that the query has been received (YES in S901), he control unit 31 performs an output data return process (see FIG. 17) S902. Details of the output data return process will be described later, and a process of reading the output data in response to the query from the output database 34 and transmitting the read output data as return data in response to the query to the multifunction device 10 as the query source is performed in the output data return process. When the output data return process is finished, the control unit 31 waits in S901 until the query is received again or the ordering data is received.

On the other hand, when it is determined that the ordering data is received (YES in S903), the control unit 31 performs an ordering data analyzing process (see FIG. 19) in S904. Details of the ordering data analyzing process will be described, and a process of reading out characters written to the original document (request form) by the user, information of the condition ID, and information of the advertising provider ID from the image data included in the received ordering data and accepting the user's request (order) is performed in the ordering data analyzing process. The control unit 31 waits in S901 until receiving the query or the ordering data again.

[3.10. Output Data Return Process]

Figure 17:
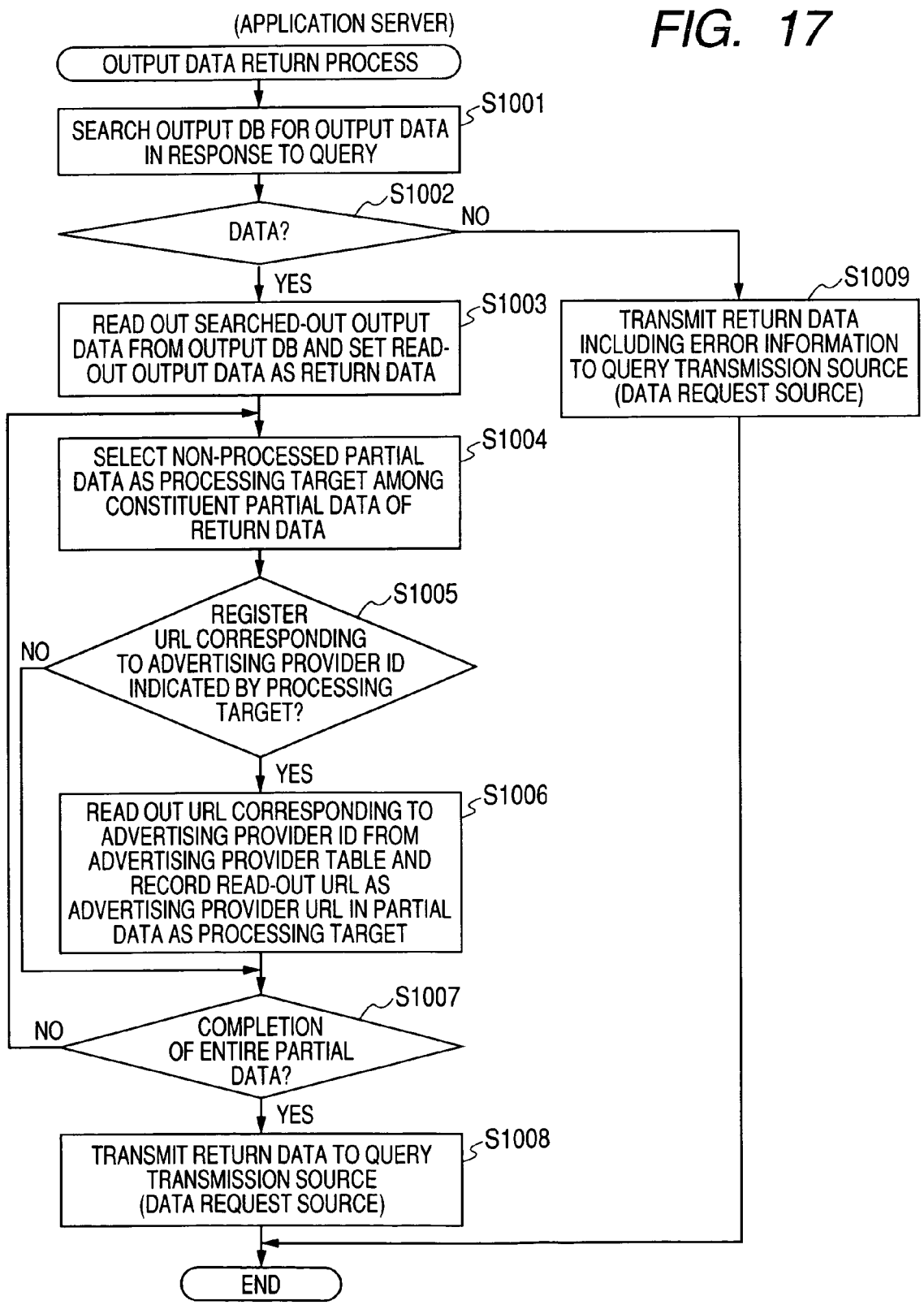
FIG. 17 is a flowchart illustrating an output data return process performed by the control unit.

Next, the output data return process performed in S902 in the application server operation (FIG. 16) will be described with reference to the flowchart shown in FIG. 17.

When the output data return process is started, the control unit 31 searches the output database 34 for output data specified by the received query (S1001) and determines whether the output data as the search target (output data specified by the received query) exists in the output database 34 (S1002). When it is determined that the output data as the search target exists in the output database 34 (YES in S1002), the control unit reads out the output data as the search target from the output database 34 and sets the read-out output data as return data (S1003). When this process is finished, the control unit performs the process of S1004. The information of the advertising provider URL is not defined in the output data read out in S1003, but is inserted into the output data in the processes after the advertising provider URL as needed.

In S1004, the control unit 31 selects non-processed partial data as a processing target among constituent partial data of the return data for the processes posterior to S1005. When this process is finished, the control unit 31 determines whether the URL of the advertising provider server 50 (URL of aggregation data destination) corresponding to the advertising provider ID indicated by the partial data as the processing target is registered in the advertising provider table 35 (S1005).

FIG. 18 is an explanatory diagram illustrating a configuration of the advertising provider table 35 stored in the memory unit 33. As shown in FIG. 18, the advertising provider table 35 has a record including an advertising provider ID field and a URL field every advertising provider. The advertising provider IDs assigned to the advertising providers are recorded in the advertising provider ID field. The URL of the advertising provider server 50 requested from the advertising provider is recorded in the URL field of the record corresponding to the advertising provider requested for registering the URL thereof.

That is, the control unit 31 determines in S1005 whether the URL is recorded in the record in the advertising provider table 35 in which the advertising provider ID indicated by the partial data as the processing target is described. When it is determined that the URL is described (YES in S1005), the control unit records the URL, which is recorded in the record corresponding to the advertising provider ID indicated by the partial data as the processing target, as the advertising provider URL in the partial data as the processing target along with the advertising provider URL start tag and the advertising provider URL end tag. When the process of S1006 is finished, the control unit 31 performs the process of S1007.

On the other hand, when it is determined in S1005 that the URL of the advertising provider server 50 corresponding to the advertising provider ID indicated by the partial data as the processing target is not recorded in the advertising provider table 35 (NO in S1005), the control unit 31 performs the process of S1007 without performing the process of S1006.

The control unit 31 determines in S1007 whether the processes posterior to S1005 are performed to the entire partial data of the return data. When it is determined that the processes posterior to S1005 are not performed to the entire partial data of the return data (NO in S1007), the control unit performs the process of S1004 again.

On the other hand, when it is determined that the processes posterior to S1005 are performed to the entire partial data of the return data (YES in S1007), the control unit 31 transmits the return data after edition to the transmission source of the query (S1008). Thereafter, the output data return process is ended.

When it is determined in S1002 that the output data as the search target do not exist in the output database 34 (NO in S1002), the control unit 31 transmits the return data, in which error information is described, to the transmission source of the query in S1009. Thereafter, the control unit ends the output data return process.

[3.11. Ordering Data Analyzing Process]

Figure 19:
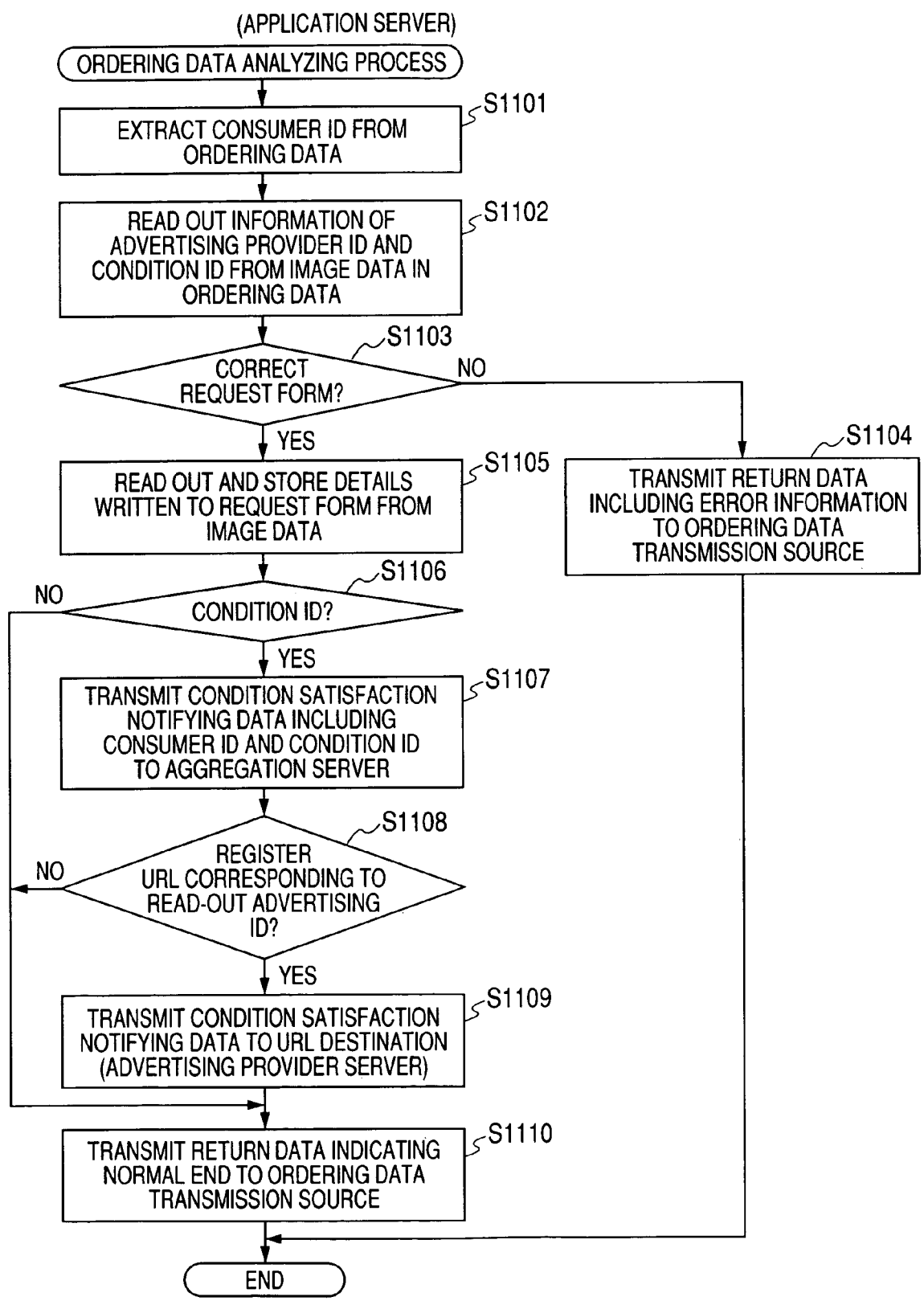
FIG. 19 is a flowchart illustrating an order data analyzing process performed by the control unit.

Next, the ordering data analyzing process performed in S904 in the application server operation (FIG. 16) will be described with reference to the flowchart shown in FIG. 19.

When the ordering data analyzing process is started, the control unit 31 extracts the consumer ID included in the ordering data from the received ordering data (S1101) and reads out the advertising provider ID and the condition ID from the image data included in the ordering data (S1102).

The advertising ID and the condition ID read out here were described in the request form serving as a basis for generating the image data. That is, in S1102, the control unit 31 a series of characters including characters "advertising provider ID:" described in the request form as the information of the advertising provider ID, and reads out a series of characters including characters "condition ID:" described in the request form (see FIG. 3C).

When this process is finished, the control unit 31 performs a process of sensing the identification image at the upper-left side in the request form (see FIG. 3C) in S1103 so as to determine whether the received request form is correct. In the exemplary aspect, the identification image indicating that the request form is correct is necessarily attached to a predetermined position of the normal request form.

When the identification image cannot be sensed in the sensing process, the control unit 31 determines that the received request form is not correct (NO in S1003), and transmits the return data containing error information to the transmission source of the order data (S1104). Thereafter, the control unit ends the ordering data analyzing process.

On the other hand, when the identification image can be sensed in the sending process, the control unit 31 determines that the received request form is correct (YES in S1003), and performs the process of S1005. The control unit reads out the characters described in the request form by the user from the received ordering data along with the column titles described in the request form (characters "designation of plan", "address", "name", "number of persons", "departure time" in the example shown in FIG. 3C) and registers the characters described by the user in an order acceptance file (not shown) in the memory unit 33 along the information of the column titles (S1105).

When the process of S1105 is finished, the control unit 31 determines in S1106 whether the condition ID exists in the information read out in S1102.

When it is determined that the condition ID exists in the read-out information (YES in S1106), the control unit 31 generates condition satisfaction notifying data including the consumer ID extracted in S1101 and the condition ID read out in S1102 and transmits the condition satisfaction notifying data to the aggregation server 40 through the Internet 3 (S1107).

When the process of S1107 is finished, the control unit 31 determines whether the URL is recorded in the record in the advertising provider table 35 indicating the advertising provider ID, which is indicated by the information of the advertising provider ID read out in S1102 (S1008). When the advertising provider ID does not exist in the information read out in S1102, the control unit considers the URL as not being described in the record of the advertising provider table 35, and performs the process of S1110.

When it is determined that the URL is recorded in the advertising provider table 35 (YES in S1108), the control unit transmits the same data as the condition satisfaction notifying data, which were transmitted to the aggregation server 40, to the destination of the URL (the advertising provider server 50 of the advertising provider) indicated by the record registered in the advertising provider table 35 (S1109). When this process is finished, the control unit 31 performs the process of S1110.

On the other hand, when it is determined in S1106 that the condition ID does not exist, the control unit 31 performs the process of S1110 without performing the processes of S1107 to S1109. In addition, when it is determined in S1108 that the URL is not recorded in the record of the advertising provider table 35 indicating the advertising ID, the control unit 31 performs the process of S1110 without performing the process of S1109.

In S1110, the control unit 31 transmits the return data indicating that the ordering acceptance is finished normally to the transmission source of the ordering data through the Internet 3. Thereafter, the control unit ends the ordering data analyzing process.

[3.12. Aggregation Server Operation]

Figure 20:
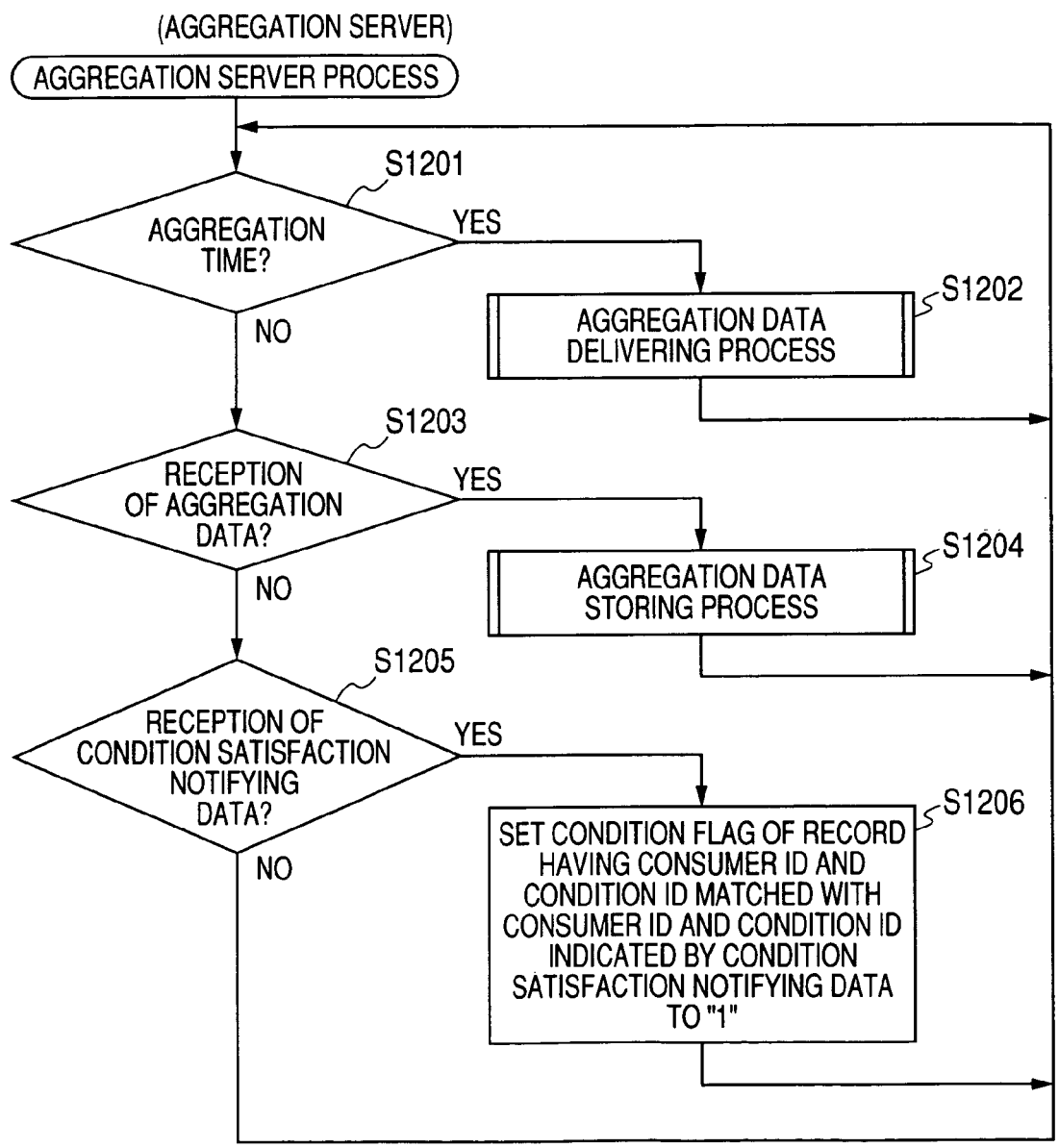
FIG. 20 is a flowchart illustrating an aggregation server operation performed by a control unit of an aggregation server.

Subsequently, the aggregation server operation performed by the control unit 41 of the aggregation server 40 will be described with the flowchart shown in FIG. 20. The aggregation server operation is started when the aggregation server 40 is turned on.

When the aggregation server operation is started, the control unit 41 determines in S1201 whether a predetermined aggregation time comes. In the exemplary aspect, a plurality of aggregation times such as 9 O'clock, 12 O'clock, 15 O'clock, and 18 O'clock are set as the aggregation time, and it is determined in S1201 which of the predetermined aggregation times comes.

When it is determined that the aggregation time comes (S1201), the control unit 41 performs the aggregation data delivering process (see FIG. 25) in S1202. Details of the aggregation data delivering process will be described later, and the records stored in the aggregation table 45 are processed and information on the amount of expendable items consumed by the multifunction device 10 is transmitted to the mail address of the adverting provider in the aggregation data delivering process. When the process of S1202 is finished, the control unit 41 performs the process of S1201.

On the other hand, when it is determined in S1201 that the aggregation time does not come, the control unit 41 determines in S1203 whether the aggregation data (the aggregation data transmitted in S715) are received through the Internet 3 from the multifunction device. When it is determined that the aggregation data are received from the multifunction device 10 (YES in S1203), the control unit performs an aggregation table storing process (see FIG. 21) in S1204. Details of the aggregation table storing process will be described later, and a process of converting the amount of expendable items indicated by the received aggregation data into points corresponding to the amount of money and registering the record including the points, the advertising provider ID, the consumer ID, and the condition ID indicated by the received data in the aggregation table 45 is performed in the aggregation table storing process.

When it is determined that the aggregation data are not received from the multifunction device 10 (NO in S1203), the control unit 41 determines in S1205 whether the condition satisfaction data are received from the application server 30. When it is determined that the condition satisfaction notifying data are received (YES in S1205, the control unit records a value "1" as a condition flag value in the record indicating the consumer ID and the condition ID matched with the consumer ID and the condition ID indicated by the condition satisfaction notifying data, among the records in the aggregation table 45. When the process of S1206 is finished, the control unit 41 performs the process of S1201 again.

On the other hand, when it is determined that the condition satisfaction notifying data are not received from the application server 30 (NO in SS1205), the control unit 41 performs the process of S1201 without performing the process of S1206.

[3.13. Aggregation Table Storing Process]

Figure 21:
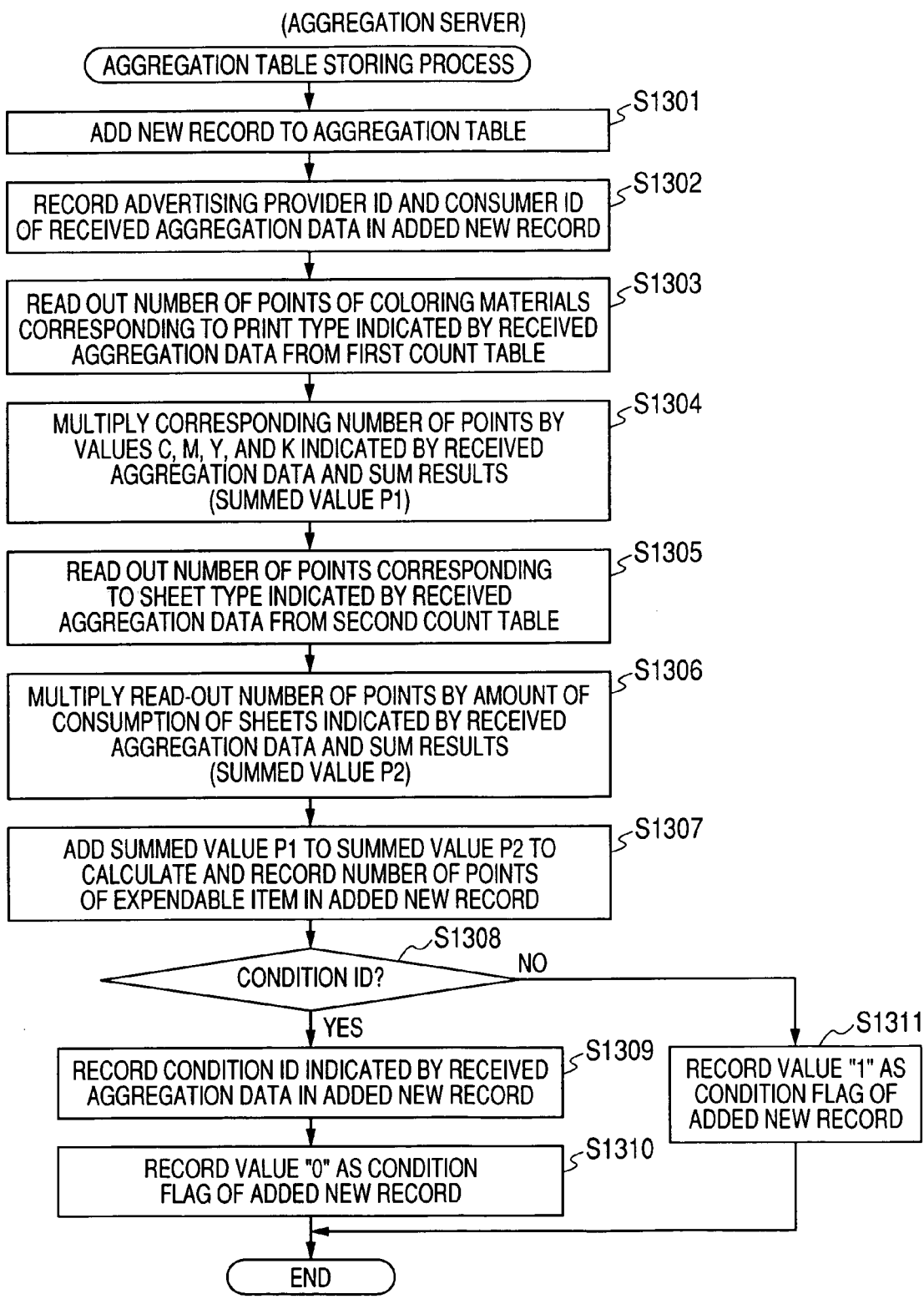
FIG. 21 is a flowchart illustrating an aggregation table storing process performed by the control unit.

Next, the aggregation table storing process performed in S1204 in the aggregation server operation (FIG. 20) will be described with reference to the flowchart shown in FIG. 21.

When the aggregation table storing process is started, the control unit 41 generates an empty new record in the aggregation table 45 in S1301. A new record including an advertising provider ID field, a consumer ID field, an expendable item point field, a condition ID field, and a condition flag field is generated in the aggregation table 45 through this process. FIG. 22 is an explanatory diagram illustrating a configuration of the aggregation table 45.

When the process of S1031 is finished, the control unit 41 records the advertising provider ID indicated by the received aggregation data in the advertising provider ID field in the new record and records the consumer ID indicated by the received aggregation data in the consumer ID field in the new record (S1302).

When this process is finished, the control unit 41 reads out the number of points of each coloring material corresponding to the print type indicated by the received aggregation data from the first count table 46 (S1303). FIG. 23 is an explanatory diagram illustrating a configuration of the first count table 46.

As shown in FIG. 23, the first count table 46 includes the number of points of the cyan coloring material, the number of points of the magenta coloring material, the number of points of the yellow coloring material, and the number of points of the black coloring material every print type (every value which can be selected as the value of the print type). The number of points of each coloring material indicates the amount of money corresponding to the amount of the corresponding coloring material required for forming (printing) the pixels of the corresponding color.

When the process of S1303 is finished, the control unit 41 calculates a summed value P1 by multiplying the amount of consumption of each coloring material indicated by the aggregation data by the number of points of the coloring material read out from the first count table 46 and summing the multiplication results of the coloring materials (S1304).

That is, the control unit calculates a value (Hc×Pc) by multiplying the amount of consumption Hc of the cyan coloring material indicated by the aggregation data by the number of points Pc of the cyan coloring material read out from the first count table 46, and calculates a value (Hm×Pm) by multiplying the amount of consumption Hm of the magenta coloring material indicated by the aggregation data by the number of points Pm of the magenta coloring material read out from the first count table 46.

The control unit calculates a value (Hy×Py) by multiplying the amount of consumption Hy of the yellow coloring material indicated by the aggregation data by the number of points Py of the yellow coloring material read out from the first count table 46, and calculates a value (Hk×Pk) by multiplying the amount of consumption Hk of the black coloring material indicated by the aggregation data by the number of points Pk of the black coloring material read out from the first count table 46. The value P=Hc×Pc+Hm×Pm+Hy×Py+Hk×Pk is obtained by summing the resultant values.

When the process of S1304 is finished, the control unit 41 reads out the number of points corresponding to the sheet type indicated by the received aggregation data from the second count table 47 (S1305). FIG. 24 is an explanatory diagram illustrating a configuration of the second count table 47. In the exemplary aspect, the second count table 47 includes the number of points corresponding to the amount of money for a sheet every sheet type (every value which can be employed as the value of the sheet type).

When the process of S1305 is finished, the control unit 41 calculates a value P2=Hs×Ps by multiplying the amount of consumption of sheets Hs indicated by the aggregation data by the number of points Ps read out from the second count table 47.

When the process of S1306 is finished, the control unit calculates the point of expendable items P=P1+P2 by adding the value P2 obtained in S1306 to the value P1 obtained in S1304, and records the point of the expendable items P in the expendable point of the new record (S1307).

Thereafter, the control unit 41 determines whether the condition ID is described in the received aggregation data (S1308). When it is determined that the condition ID is described (YES in S1308), the control unit records the condition ID indicated by the aggregation data in the condition ID field of the new record (S1309). When this process is finished, the control unit 41 records a value "0" as the condition flag in the condition flag field of the new record (S1310). Thereafter, the control unit ends the aggregation table storing process.

On the contrary, when it is determined that the condition ID is not described in the received aggregation data (YES in S1308), the control unit 41 records a value "1" as the value of the condition flag in the condition flag field of the new record (S1311). Thereafter, the control unit ends the aggregation table storing process.

[3.14. Aggregation Data Delivering Process]

Next, the aggregation data delivering process performed in S1202 in the aggregation server operation (FIG. 20) will be described with reference to the flowchart shown in FIG. 25.

When the aggregation data delivering process is started, the control unit 41 selects one mail address not set as a destination in S1403 as the mail address as the processing target among the mail addresses recorded in the mail address table 44

(S1401). FIG. 26 is an explanatory diagram illustrating a configuration of the mail address table 44. The advertising provider ID and the mail address requested from the advertising provider are correlated with each other every pre-recorded advertising provider and stored in the mail address table 44 of the aggregation server 40.

When the process of S1401 is finished, the control unit 41 reads out a record having the condition flag value of "1" and indicating an advertising provider ID matched with the advertising provider ID, which is correlated with the mail address as the processing target selected in S1401 and is recorded in the mail address table 44, from the aggregation table 45 (S1402).

When this process is finished, the control unit 41 generates an electronic mail in which information (values of advertising provider ID, consumer ID, expendable point, condition ID, and condition flag) indicated by the records read out in S1402 is described, and sets the mail address as the processing target as the destination of the electronic mail (S1403).

Thereafter, the control unit 41 sends the electronic mail to the terminal of the advertising provider through a mail server not shown by sending the electronic mail, in which the mail address as the processing target is set as the destination, to the mail server (S1404).

When the process of S1404 is finished, the control unit 41 deletes the records read out from the aggregation table 45 in S1402 from the aggregation table 45 (S1405), and then performs the process of S1406. In S1406, the control unit 41 selects the entire mail addresses recorded in the mail address table 44 as the processing target in S1401 and determines whether the processes posterior to S1402 have been performed. When it is determined that the entire mail addresses are not selected as the processing target (NO in S1406), the control unit selects the non-processed mail address as the processing target in S1401 and performs the processes posterior to S1402. On the other hand, when it is determined that the entire mail addresses are selected as the processing target (YES in S1406), the control unit ends the aggregation data delivering process.

[3.15. Advertising Provider Server Operation]

Although the operation of the aggregation server 40 has been described hitherto, the advertising provider server 50 of each advertising provider performs the same operation as the aggregation server 40. Accordingly, the operation performed by the advertising provider server 50 will be described with reference to FIG. 20.

When it is turned on, the advertising provider server 50 repeatedly performs the processes of S1203 to S1206. That is, the control unit 51 repeatedly performs the same processes as the processes performed when the aggregation server 40 determines NO in S1201. The aggregation server 40 edits its own aggregation table 45 on the basis of the received aggregation data, but the advertising provider server 50 edits its own aggregation table 54 in the same way as the aggregation server 40 on the basis of the aggregation data received from the multifunction device 10. However, since the advertising server 50 does not manage the first count table 46 and the second count table 47, the control unit 51 performs an operation of acquiring the first count table 46 and the second count table 47 from the aggregation server 40 as needed.

[4. Advantage of Embodiment]

As the contents providing system 1 of this exemplary aspect is described above, by unit of the contents providing system, the multifunction device 10 communicates with the application server 30 having the output data via the communication unit 12, print-processes the received output data in the printout unit 17 through the printing control processing (S307), and outputs the print imaging each printing data possessed by the output data in the printout unit 17.

In addition, the multifunction device 10 selectively derives the amount (consumption amount of each color material and consumption amount of the paper) of the expendable item required for imaging the advertisement printing data out of the amount of the expendable item required for imaging the output data to describe them in the aggregation data. And the expendable item point corresponding to the amount of the expendable item described in the aggregation data is stored in the memory unit 43 of the aggregation server 40 by transmitting the aggregation data to the aggregation server 40.

As described above, by unit of the contents providing system 1 of this exemplary aspect, since the amount of the expendable item used in printing the advertisement image based on the advertisement printing data is derived in accordance with a size of the advertisement image, even if the size of the advertisement image indicated by the advertisement printing data provided from the application server 30 is not constant, the amount of the expendable item required for print-processing the each advertisement printing data is derived adequately to store the corresponding value in the aggregation server 40. Accordingly, in accordance with this exemplary aspect, the cost required for the advertisement printing can be adequately returned to the user. In other words, the money amount appropriate for the amount of the expendable item used for the advertisement printing in reality can be returned to the user.

In addition, in this exemplary aspect, in case that a plurality of advertisement printing data are stored in the output data with the advertisement ID information (i.e. in case that a plurality of advertisement data are stored in the output data), and the control unit 11 of the multifunction device 11 counts the amount of the expendable item required for imaging the advertisement printing data for each advertisement printing datum to which the similar advertiser ID is attached when the multifunction device 10 receives the output data. And the aggregation server 40 classifies the amount of the expendable item for each advertiser ID and describes the expendable item point corresponding to the amount of the expendable item indicated by the aggregation data received from the multifunction device 10 in the aggregation table 45.

Accordingly, in the contents providing system 1 of this exemplary aspect, the return of the money amount corresponding to the consumption amount of the expendable item is requested on each advertiser, based on the contents of the aggregation table 45. In other words, the amount (expendable item point) of the expendable item consumed for printing the advertiser's own advertisement can be correctly notified to each advertiser.

In addition, the multifunction device 10 communicates with the advertiser server 50 as the communication device managed by each advertiser to which the advertiser code can be assigned, and transmits the same as the counting data transmitted to the aggregation server 40 to the advertiser server 50 of the advertiser corresponding to the advertisement printing data who consumes the expendable item having the amount indicated by the counting data. Accordingly, the user of the multifunction device 10 needs not to report the amount of the expendable item required for the advertisement printing to the advertiser and request the return of the cost.

Further, in the contents providing system 1 of this exemplary aspect, in case that the advertisement image and the non-advertisement image are printed one sheet of paper, the amount (an occupancy of the paper) corresponding to an area of the advertisement image is derived as the consumption amount of the paper for each advertisement type, and in case that the only advertisement image is printed in one sheet of paper, one sheet of paper including a blank part of the paper where an image is not formed is consumed for printing the advertisement image to derive the consumption amount of the paper for each advertisement type. And the consumption amount of the expendable item derived for each page is counted throughout a plurality of pages, and the counting data are generated for each advertisement type, the counting data being transmitted to the aggregation server 40.

Accordingly, in the contents providing system 1, the amount of the expendable item consumed for printing the advertisement image can be recorded to fit to general values (i.e. the values that it is natural that the cost for one sheet of page is returned to the advertiser in case that the only advertisement is printed) of the user who performs the advertisement printing.

Besides, in this exemplary aspect, the aggregation table 45 is commonly provided with respect to each multifunction device 10, and the amount of the expendable item consumed in each multifunction device 10 is saved in the aggregation table 45 together with the consumer ID which is the identification code of the consumer (user) notified from the multifunction device 10. And each information is intensively managed in the aggregation server 40. Accordingly, by unit of the contents providing system 1 of this exemplary aspect, the user can efficiently realize a service that the user returns the cost required for the advertisement printing from the advertiser to the user.

Particularly, in this exemplary aspect, since each expendable item point is written in the aggregation table 45 in association with the consumer ID and the advertiser ID, each expendable item point can be managed in the aggregation table 45 so that a user can grasp how much the amount of the expendable item is used. Accordingly, in accordance with this exemplary aspect, the service can be realized by a broker who connects the advertiser with the consumer, whereby realizing the service more efficiently.

In addition, in this exemplary aspect, the aggregation server 40 collectively describes a group of expendable item points stored in association with the same advertiser ID within an e-mail together with the consumer ID information in association with each expendable item point, and transmits the group of the expendable item points in an e-mail to the terminal device of the corresponding advertiser. Accordingly, in accordance with this exemplary aspect, the information of the expendable item point can be adequately transferred from the aggregation server 40 to the advertiser.

Further, in this exemplary aspect, the expendable item point is notified from the aggregation server 40 to the terminal device of the advertiser in the e-mail, and transmits the counting data from the multifunction device 10 to the advertiser server 50. Accordingly, in the contents providing system 1, the advertiser can verify whether or not there is a mistake in transferring the information by comparing the information (counting data and expendable item) representing the amount of the expendable item transmitted from each path.

Further, in this exemplary aspect, in the aggregation table 45, the expendable item point is stored in association with the condition flag, and the notification of the consumable point to the advertiser is controlled with the condition flag. In other words, an only record where the value of the condition flag is "1" is retrieved within the aggregation table to determine whether or not a transmission condition of each expendable item point is satisfied. Then, when the transmission condition is satisfied with respect to the record where the value of the condition flag is "1", the expendable item point indicated by the record is notified to advertiser.

Since the value of the condition flag is changed to "1", based on condition satisfaction notification data only in case that there is an order based on the corresponding to the advertisement image, the expendable item point is notified from the aggregation server 40 to the advertiser in case that the corresponding advertisement is effective.

Accordingly, the contents providing system 1 of this exemplary aspect is the system very suitable for the advertiser's request that the advertiser wants to perform the return to the consumer firstly after an order based on the advertisement image is performed without performing the return to the consumer only by the advertisement printing.

Incidentally, a contents providing system corresponds to the multifunction device 10 and an information recording system corresponds to the contents providing system 1.

In addition, a contents server corresponds to the application server 30, a printer corresponds to the recording unit 17, an information management device corresponds to the aggregation server 40 and a memory unit corresponds to the memory unit 43 of the aggregation server. Besides, non-advertising contents data correspond to general data and advertising contents data correspond to advertising data In addition, a code representing the type of advertisement corresponds to any one of the advertising provider ID, the advertising provider URL and the condition ID, or a plural combination. Besides, a code representing the advertising provider corresponds to the advertising provider ID and a user identification code corresponds to the consumer ID. In addition, information representing the amount of the expendable item corresponds to the expendable item point corresponding to the consumption amount of each color material and the consumption of the paper indicated by the counting data.

Further, a communication unit is realized by the communication unit 12, and the processings in S102 and S103, and a print control unit is realized by the processing in S105, and an expendable amount deriving unit is realized by the processings in S507 to S509 and S701 to S714. In addition, an e expendable amount storing control unit is realized by the processings in S715 to S719. Besides, a division transmitting unit is realized in S1201 and S1202, and a transmission condition determining unit and a determining unit are realized by an order data analysis processing, and the processings in S1205 and S1206.

[5. Other Examples]

Although the exemplary aspect of the invention has been described, the invention may be modified in various forms.

For example, the multifunction device 10 can use constant coloring materials in the exemplary aspect, but the multifunction device 10 may use more various coloring materials. The multifunction device 10 may store the print type of the coloring material in use in the memory area of the memory unit 20.

Specifically, a configuration in which the print type of the coloring material in use is input from the user by means of the manipulation of the keys in the manipulation unit 14 may be added to the multifunction device 10. In another example, a configuration in which the print type is read out from the equipped cartridge on the condition that the print type is stored in a cartridge containing the coloring materials may be added to the multifunction device 10.

In the exemplary aspect, the print control process or the like has been described on the condition that the multifunction device 10 has the printout unit 17 of an inkjet type for jetting ink to a sheet to form an image on the sheet, but the printout unit 17 may a printout unit of a laser printer type and the multifunction device 10 may have a configuration in which an image is formed on a sheet using a toner as the coloring material. The contents providing system 1 may be embodied as a system in which an inkjet type multifunction device 10 and a laser printer type multifunction device are combined.

In the exemplary aspect, the points of expendable items (the amount of consumption of expendable items) are calculated on the basis of the number of pixels of the printed image, the kinds of the coloring materials, or the type of the sheets, but the points of expendable items may be calculated on the basis of other information. For example, the points of expendable items may be calculated on the basis of information such as the number of printed characters and the print time.

In addition, although the multifunction device 10 has been used as the printing apparatus in the above-mentioned aspect, printing apparatuses (printer, facsimile, copier, and the like) may be used instead of such a multifunction device so as to construct the contents providing system 1.

What is claimed is:

1. An information recording system comprising:
a plurality of printing apparatuses, each printing apparatus comprising:
a printing unit;
a communication unit that communicates with a contents server having contents data;
a print control unit that controls the printing unit to print the contents data and output a printed material imaging the contents data if the communication unit receives the contents data from the contents server;
an expendable amount deriving unit that derives an amount of an expendable item required for imaging the contents data in the printing unit, the expendable amount deriving unit deriving the amount of the expendable item in accordance with a size of an image printed by the printing unit; and
an expendable amount storing control unit that stores information representing the amount of the expendable item derived by the expendable amount deriving unit in a memory unit; and
an information management device comprising:
a common memory unit shared by each printing apparatus;
a division transmitting unit configured to communicate with a communication device managed by each advertising provider to which an advertising provider code is assigned; and
a receiving unit configured to receive a condition ID that indicates that a specific condition is satisfied and a user identification code corresponding to a user,
wherein the expendable amount storing control unit possessed by each printing apparatus stores the amount of the expendable item for each advertising provider derived by the expendable amount deriving unit possessed by the printing apparatus in the common memory unit in association with the user identification code and the advertising provider code, and
wherein, when the receiving unit receives the condition ID and the user identification code, the division transmitting unit transmits the amount of the expendable item associated with the received user identification code and stored in the common memory unit to the communication device of the advertising provider that corresponds to the advertising provider code associated with the amount of expendable item together with the received user identification code.

2. The information recording system according to claim 1, further comprising a transmitting condition determining unit that determines whether or not a transmitting condition of the information is satisfied with respect to each information representing the amount of the expendable item stored in the common memory unit,
wherein the division transmitting unit transmits each information representing the amount of the expendable item determined to be satisfied by the transmitting condition determining unit to the corresponding communication device of the advertising provider.

3. The information recording system according to claim 1, further comprising a determining unit that determines whether or not an advertisement corresponding to the information is effective with respect to each information representing the amount of the expendable item stored in the common memory unit,
wherein the division transmitting unit transmits each information representing the amount of the expendable item corresponding to the advertisement determined to be effective by the determining unit to the corresponding communication device of the advertising provider.

4. The information recording system according to claim 3, wherein the determining unit determines whether or not an order is made referring to the advertisement.

5. A method for information recording using a plurality of printing apparatuses, each printing apparatus comprising a printing unit, and using an information management device comprising a common memory unit shared by each printing apparatus; the method comprising the steps of:
communicating with a contents server having contents data;
controlling the printing unit to print the contents data and to output a printed material imaging the contents data, if the contents data is communicated from the contents server;
deriving an amount of an expendable item required for imaging the contents data in the printing unit, such that the derived amount of the expendable item corresponds to a size of an image printed by the printing unit;
storing information representing the derived amount of the expendable item in a memory unit;
communicating with a communication device managed by each advertising provider to which an advertising provider code is assigned;
storing the derived amount of the expendable item for each advertising provider in the common memory unit in association with an identification code of a user and the advertising provider code; and
when receiving a condition ID that indicates that a specific condition is satisfied and the user identification code, transmitting the amount of the expendable item associated with the received user identification code and stored in the common memory unit to the communication device of the advertising provider that corresponds to the advertising provider code associated with the amount of the expendable item together with the received user identification code.

6. An information management device comprising:
a common memory unit shared by each of a plurality of printing apparatuses;
a division transmitting unit configured to communicate with a communication device managed by each advertising provider to which an advertising provider code is assigned; and a receiving unit configured to receive a condition ID that indicates that a specific condition is satisfied and a user identification code corresponding to a user, wherein an expendable amount storing control unit possessed by each printing apparatus stores an amount of an expendable item for each advertising provider derived by an expendable amount deriving unit possessed by each printing apparatus in the common memory unit in association with the user identification code and the advertising provider code, and wherein, when the receiving unit receives the condition ID and the user identification code, the division transmitting unit transmits the amount of the expendable item associated with the received user identification code and stored in the common memory unit to the communication device of the advertising provider that corresponds to the advertising provider code associated with the amount of the expendable item together with the received user identification code.

* * * * *